(12) United States Patent
Comaravelou et al.

(10) Patent No.: US 11,877,254 B2
(45) Date of Patent: Jan. 16, 2024

(54) SYSTEMS AND METHODS TO AVAIL SERVICES OF A NETWORK

(71) Applicant: SAMSUNG ELECTRONICS CO., LTD., Suwon-si (KR)

(72) Inventors: Sivasankar Comaravelou, Bangalore (IN); Prasad Basavaraj Dandra, Bangalore (IN); Vijay Ganesh Surisetty, Bangalore (IN); Anikethan Ramakrishna V, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/214,877

(22) Filed: Mar. 28, 2021

(65) Prior Publication Data
US 2021/0306971 A1 Sep. 30, 2021

(30) Foreign Application Priority Data
Mar. 27, 2020 (IN) .............................. 202041013519

(51) Int. Cl.
*H04W 60/04* (2009.01)
*H04W 76/25* (2018.01)
(Continued)

(52) U.S. Cl.
CPC ......... *H04W 60/04* (2013.01); *H04L 65/1016* (2013.01); *H04W 4/14* (2013.01); *H04W 8/245* (2013.01); *H04W 76/25* (2018.02)

(58) Field of Classification Search
None
See application file for complete search history.

(56) References Cited

U.S. PATENT DOCUMENTS 10,499,357 B1 * 12/2019 Tiwari .................. H04W 12/08
2019/0007500 A1 1/2019 Kim et al.
(Continued)

FOREIGN PATENT DOCUMENTS

| WO | 2020003576 | 1/2020 |
|----|------------|--------|
| WO | 2020098926 | 5/2020 |

OTHER PUBLICATIONS

Qualcomm Incorporated et al: "Update ta GS registration type IE and introduction of a new 5GS update type IE" (Year: 2018).*
(Continued)

*Primary Examiner* — Alex Skripnikov
*Assistant Examiner* — Pamit Kaur
(74) *Attorney, Agent, or Firm* — F. CHAU & ASSOCIATES, LLC

(57) ABSTRACT

A user equipment (UE) may ascertain an incapability of the network to process a pending uplink signal based on a registration acceptance message from the network. For instance, a registration acceptance message from the network, that may indicate the network is not capable of processing the pending uplink signal service. Accordingly, upon ascertaining the incapability of the network to process the pending uplink signal, the UE may release a connection (e.g., a N1 Non-Access Stratum (NAS) signaling connection) between the UE and the network, where the connection is based on camping of the UE at a cell corresponding to the radio access network (RAN) (e.g., the NG-RAN) of the network. Alternatively, the UE may initiate one of an implementation dependent timer and a release timer (e.g., a T3540 timer) to release the connection (e.g., to release the N1 NAS signaling connection).

20 Claims, 14 Drawing Sheets

(51) Int. Cl.
   *H04L 65/1016* (2022.01)
   *H04W 4/14* (2009.01)
   *H04W 8/24* (2009.01)

(56) References Cited

U.S. PATENT DOCUMENTS

| | | | |
|---|---|---|---|
| 2019/0182655 A1* | 6/2019 | Gupta | H04W 76/27 |
| 2020/0008167 A1 | 1/2020 | Venkataraman et al. | |
| 2020/0275513 A1* | 8/2020 | Park | H04W 76/22 |
| 2021/0105670 A1* | 4/2021 | Chiang | H04W 60/005 |
| 2021/0168751 A1* | 6/2021 | Stojanovski | H04W 60/00 |
| 2022/0070967 A1* | 3/2022 | Li | H04W 4/40 |

OTHER PUBLICATIONS

3rd Generation Partnership Project; Technical Specification Group : Gore Network and Terminals; Non-Access-Stratum (NAS) protocal for 5G System (4GS); Stage 3 (Release 16) (Year: 2019).*
European Search Report dated Sep. 1, 2021 in related European Patent Application No. 21165317.5 (16 pages).
3rd Generation Partnership Project; 3GPP TS 24.501 V16.3.0 (Dec. 2019), 645 pages.
Update to 5GS registration type IE and introduction of a new 5GS update type IE; 3GPP TSG-CT WG1 Meeting #112bis, Oct. 2018, 23 pages.

* cited by examiner

SYSTEMS AND METHODS TO AVAIL SERVICES OF A NETWORK

CROSS-REFERENCE TO RELATED APPLICATION

This application claims priority to, and the benefit of, Indian Provisional Patent Application No. 202041013519 filed on Mar. 27, 2020. The entire contents of the foregoing application are hereby incorporated by reference for all purposes.

BACKGROUND

The following relates generally to network procedures, and more specifically to network procedures performed by a user equipment (UE) to avail services (e.g., fifth generation (5G) services) of a network.

Wireless communication systems are widely deployed for providing various telecommunication services such as telephony, video, data, messaging, broadcasts and so on. Typical wireless communication systems employ multiple-access technologies capable of supporting communication with multiple users by sharing available system resources (for example, bandwidth, transmit power and so on). Examples of such multiple-access technologies include code division multiple access (CDMA) systems, time division multiple access (TDMA) systems and the like. Additionally, the systems can conform to specifications such as third generation partnership project (3GPP), 3GPP long term evolution (LTE), etc.

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system may also be called a 'beyond 4G network' or a 'post long term evolution (LTE) system'. The 5G communication system may be considered to be implemented in higher frequency (e.g., millimeter wave (mmW)) bands, such as 60 GHz bands, so as to accomplish higher data rates.

Techniques including, for example, beamforming, massive multiple-input multiple-output (MIMO), full dimensional-MIMO (FD-MIMO), array antenna, and analog beam forming may be implemented in 5G communication systems to decrease propagation loss of radio waves and increase transmission distances. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In some networks, UEs may communicate with the network via one or more base stations connected to an access and mobility management function (AMF) of the network. For example, a base station may communicate transmission packets with a UE. Communication links between a base stations and a UE may include uplink (also referred to as reverse link) transmissions from a UE to a base station, as well as downlink (also referred to as forward link) transmissions from a base station to a UE.

In some cases, a UE may be configured to transmit a registration request including to register the UE for certain services on the network. As an example, to register a UE for services (e.g., "Short Messaging Service (SMS) over Non-Access Stratum (NAS)" services) on the network, a UE may be configured to transmit a registration request including a Follow On Request (FOR) bit (e.g., set to "FOR Pending") an SMS bit (e.g., set to "SMS over NAS supported"). However, in some cases, the network may not support, or may not accept, the registration request. In such scenarios, inefficient use of network resources may arise. For example, the network and the UE may not release a connection (e.g., as the UE may have indicated pending uplink transmission), yet the network may not support the requested service. Accordingly, improved techniques for availing services (e.g., 5G services) of a network may be desired.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

A method, apparatus, non-transitory computer readable medium, and system for network procedures to avail services of a network are described. In some examples, the method may be implemented in, or the apparatus and system may include, a user equipment (UE) operating in New Generation-Radio Access Network (NG-RAN). One or more embodiments of the method, apparatus, non-transitory computer readable medium, and system include receiving, in response to a registration request comprising an Information Element (IE) indicating presence of at least one pending uplink signal sent by a UE, a registration acceptance message from a network. The method further includes ascertaining an incapability of the network to process the at least one pending uplink signal based on the registration acceptance message, where the registration acceptance message indicates that the network is not capable of processing the at least one pending uplink signal and the UE is registered at the network. The method further includes performing one of: releasing a Non-Access Stratum (NAS) signaling connection (e.g., a N1 NAS signaling connection) between the UE and the network (e.g., where the NAS signaling connection is based on the UE camping at a cell corresponding to a radio access network (RAN) of the network) or initiating one of an implementation dependent timer and a release timer (e.g., a T3540 timer) to release the NAS signaling connection.

An apparatus, system, and method for network procedures to avail services of a network are described. One or more embodiments of the apparatus, system, and method include a communication unit configured to receive, in response to a registration request comprising an IE indicating presence of at least one pending uplink signal sent by a UE, a registration acceptance message from a network. One or more embodiments of the apparatus, system, and method further include a controller configured to ascertain an incapability of the network to process the at least one pending uplink signal based on the registration acceptance message, where the registration acceptance message indicates that the network is not capable of processing the at least one pending uplink signal and the UE is registered at the network. The controller may further be configured to perform one of: releasing a NAS signaling connection between the UE and the network (e.g., where the NAS signaling connection is based on camping of the UE at a cell corresponding to a RAN of the network), or initiating one of an implementation dependent timer and a release timer (e.g., a T3540 timer) to release the NAS signaling connection.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
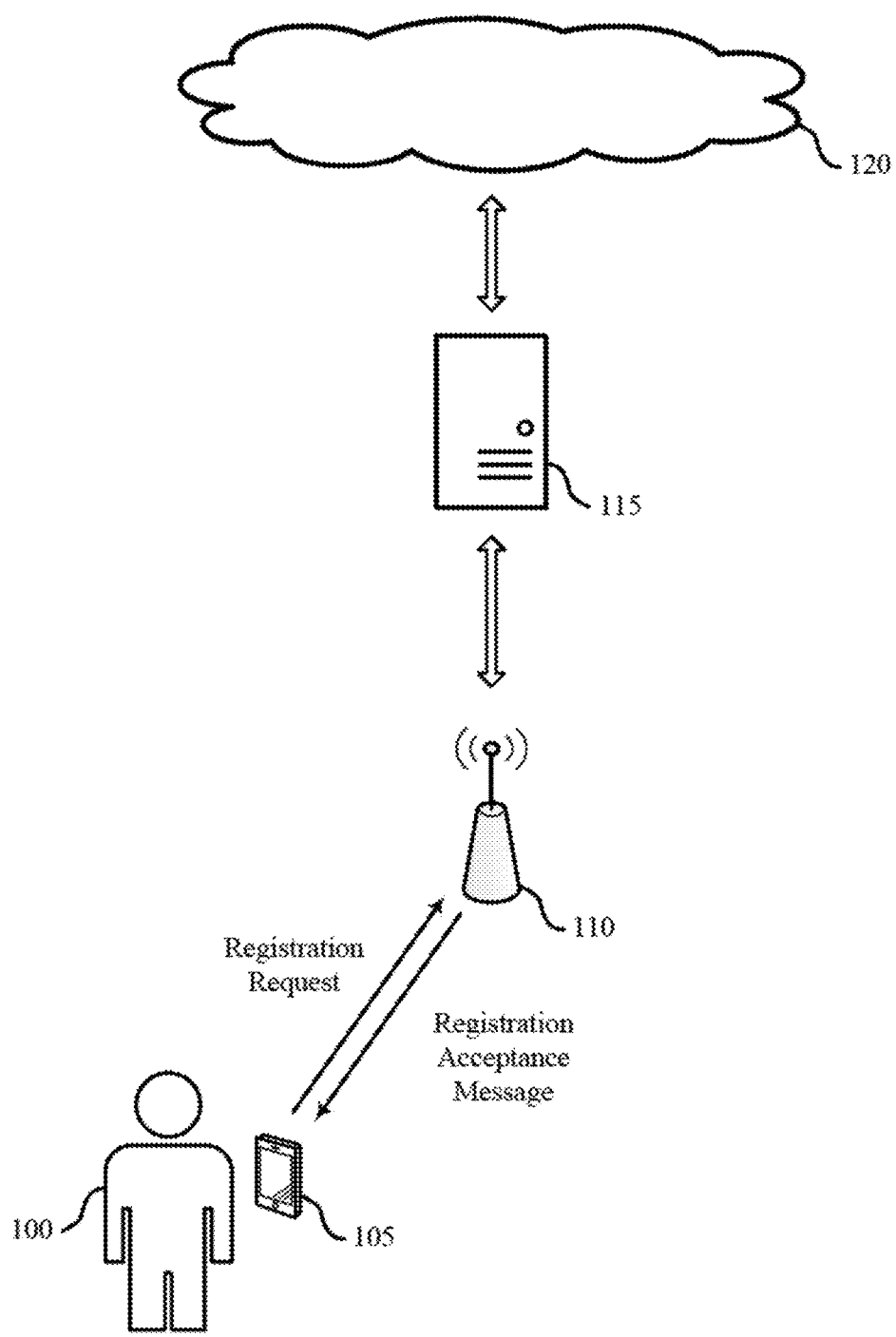
FIG. 1 shows an example of a system for availing services of a network, according to aspects of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

User equipment (UEs) may communicate with the network via one or more base stations connected to an access and mobility management function (AMF) of the network. For example, a base station may communicate transmission packets with a UE to wireless exchange information. Communication links between a base stations and a UE may include uplink (also referred to as reverse link) transmissions from a UE to a base station, as well as downlink (also referred to as forward link) transmissions from a base station to a UE.

In some cases, a UE may be configured to transmit a registration request including to register the UE for certain services on the network. As an example, to register a UE for services (e.g., "Short Messaging Service (SMS) over Non-Access Stratum (NAS)" services) on the network, a UE may be configured to transmit a registration request including a Follow On Request (FOR) bit (e.g., set to "FOR Pending") an SMS bit (e.g., set to "SMS over NAS supported"). However, in some cases, the network may not support, or may not accept, the registration request. In such scenarios, inefficient use of network resources may arise. For example, the network and the UE may not release a connection (e.g., as the UE may have indicated pending uplink transmission), yet the network may not support the requested service. Accordingly, improved techniques for availing services (e.g., 5G services) of a network may be desired.

According to techniques described herein, a UE may ascertain network capability (e.g., the capability or incapability of the network) to process UE pending uplink signals based on a registration acceptance message. Based on the UE ascertaining the network capability, the network (e.g., and the UE) may more efficiently manage (e.g., release) the connection between the UE and the network.

For instance, in response to a registration request (e.g., a registration request comprising an information element (IE) that indicates presence of at least one pending uplink signal at the UE), the network may generate and transmit a registration acceptance message to the UE. In some scenarios, the UE may ascertain an incapability of the network to process the at least one uplink signal pending at the UE based on the registration acceptance message. For instance, the registration acceptance message from the UE may indicate that the network is not capable of processing the at least one pending uplink signal and the UE is registered at the network. Accordingly, upon ascertaining the incapability of the network to process the at least one pending uplink signal, the UE may release a connection (e.g., a N1 NAS signaling connection) between the UE and the network, where the connection is based on camping of the UE at a cell corresponding to the RAN (e.g., the NG-RAN) of the network. Alternatively, the UE may initiate one of an implementation dependent timer and a release timer (e.g., a T3540 timer) to release the connection (e.g., to release the N1 NAS signaling connection).

In some embodiments, the techniques described herein include, or provide for, a number of advantages (e.g., such as the UE need not wait in a connected mode for prolonged duration if it is determined by the UE that the network may not be able to process the at least one pending uplink messages). An increase in a power consumption of the UE in the connected mode may also be avoided, as the network may not prolong the N1 signaling connection by implementing the techniques described herein. Further, the network may release the N1 NAS signaling and may further allocate a number of radio resources to other UEs in need of the radio resources (e.g., based on the resources available based on releasing the resources for the released connection). Further, if the UE is an SMS only device or a location based device (e.g., asset tracking) then the UE may attempt to access other public land mobile networks (PLMNs) configured to provide the required service by timely releasing the N1 NAS signaling connection without waiting for network to release the connection.

For promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment," "in some embodiments," "in another embodiment," and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

FIG. 1 shows an example of a system for availing services of a network according to aspects of the present disclosure. The example shown includes user 100, UE 105, base station 110, Access and Mobility Management Function (AMF) 115, and cloud 120. UE 105 is an example of, or includes aspects of, the corresponding element described with reference to FIGS. 2-11. Base station 110 and AMF 115 are examples of, or include aspects of, the corresponding elements described with reference to FIGS. 2-10.

UE 105 may include a computing device such as a personal computer, laptop computer, mainframe computer, palmtop computer, personal assistant, mobile device, or any other suitable processing apparatus. Further, UE 105 may include communications (e.g., wireless communications) capabilities and, in some cases, UE 105 may include or be referred to as a wireless device. A wireless device may include a single antenna, or more than one antenna, which may be capable of concurrently transmitting or receiving multiple wireless transmissions. In some cases, a wireless communication device may include an antenna array.

In some examples, UE 105 may include a receiver. A receiver may receive information such as packets, user data, or control information associated with various information channels (e.g., control channels, data channels, etc.). Information received at a receiver may be passed on to other components of the device, such as a communication processor. In some cases, receiver may be an example of aspects of a transceiver. In various examples, receiver may utilize a single antenna or a plurality of antennas.

In some examples, UE 105 may include a transmitter. A transmitter may transmit signals generated by other components. Information sent by a transmitter may be received from other components of the device, such as a communication processor. In some cases, transmitter may be an example of aspects of a transceiver. In various examples, transmitter may utilize a single antenna or a plurality of antennas.

In some examples, UE 105 may include a transceiver. A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem.

A UE 105 may include, but is not limited to, a smart phone, a cellular phone, a Personal Computer (PC), a laptop, a tablet, or any device capable of communicating over a cellular network such as 4G, 5G or the like. In some embodiments, the UE 105 may be configured to connect to the network and transmit at least one pending uplink message as an uplink signal. In some embodiments, the UE 105 may be connected to the network through a cell related to NG RAN. In some embodiments, the UE 105 may be configured to communicate with an AMF of the network through a next generation nodeB (gNB) connected to the network. In some embodiments, the connection between the UE 105 and the network may be an N1 NAS signaling connection. In some embodiments, the at least one pending uplink message may be one or more of one or more of a SMS, Location Services/Location Positioning Protocol (LCS/LPP), and an IP Multimedia Subsystem (IMS) service.

In some wireless communications systems, a UE 105 capable of accessing 5GS services with a valid USIM may, upon power on, try to camp a NG-RAN cell connected to 5GCN to perform registration to avail 5G services of the network. In a registration request, the UE 105 indicates its capability to support LCS, LPP, CAG, HO attach, CP-CIoT, UP-CIoT, V2X, RACS, etc. in an information element (IE) (e.g., in a SGMM capability IE to the 5GCN). If the UE 105 wants to register for "SMS over NAS", then the SMS requested bit is set to "SMS over NAS supported" in the registration request. After receiving the registration request, the network (e.g., the base station 110, the AMF 115, etc.) checks whether the registration request can be accepted or not. If the registration request is accepted by the network, the network (e.g., the AMF 115) may respond back to the UE 105 with a registration accept message. In the registration accept message (e.g., in a 5GS network support feature IE), the network may indicate a capability to support IMS voice over PS, emergency services in 5GS, location services via 5G, CP-CIoT, UP-CIoT, etc.

The network may also indicate the support of "SMS over NAS" in a registration accept message. If the UE 105 has pending uplink signaling during the initial registration or during the mobility and periodic registration update procedure, then the UE 105 shall set the Follow on Request (FOR) indicator bit in the 5GS registration type IE as "Follow on request pending" in Registration request. When the network receives a registration request with FOR bit set to "Follow on request pending", the network may not release the connection immediately after the completion of registration procedure, as the network may prolong the connection and wait for the pending uplink signaling messages from the UE 105.

A FOR indicator may be set to "Follow on request pending" in the registration request and in the Mobility and periodic registration procedure as follow. If the UE 105 initiates an initial registration for emergency services or needs to prolong the established NAS signaling connection after the completion of the initial registration procedure (e.g. due to uplink signaling pending), the UE 105 shall set the FOR indicator to "Follow on request pending." The UE 105 shall set the FOR indicator to "Follow on request pending" if the UE 105 initiates the mobility and periodic registration updating procedure upon request of the upper layers to establish an emergency PDU session, if the UE 105 initiates the mobility and periodic registration updating procedure upon receiving a request from the upper layers to perform emergency service fallback, or if the UE 105 determines to prolong the established NAS signaling connection after the completion of the registration procedure for mobility and periodic registration update (e.g. due to uplink signaling pending but no user 100 data pending).

When the FOR indicator is set to "Follow on request pending", then the AMF 115 and UE 105 may not release the connection immediately (e.g., as specified in wireless communications specification 24.501). For instance, if the UE 105 has set the FOR indicator to "Follow on request pending" in the registration request, or the network has downlink signaling pending, the AMF 115 may not immediately release the NAS signaling connection after the completion of the registration procedure.

In some examples, a registration procedure for mobility and periodic registration update is triggered. The UE 105 shall abort the service request procedure, stop timer T3517, if running and perform the registration procedure for mobility and periodic registration update. The Follow on request indicator shall be set to "Follow on request pending" in the Registration request.

UE 105 considers the FOR indicator value to start reset timer (e.g., timer T3540) to release the N1 NAS signaling connection locally (e.g., as specified in wireless communications specification 24.501). A UE 105 (e.g. a UE 105 in 3GPP access) may start a reset timer (e.g., timer T3540) if the UE 105 receives a registration accept message, the UE 105 has set the FOR indicator to "No follow on request pending" in the Registration request, and the UE 105 has not included the uplink data status IE in the Registration request or the UE 105 has included the uplink data status IE in the registration request but the registration accept message indicates that no user 100-plane resources of any PDU sessions are to be re-established.

A cloud 120 is a computer network configured to provide on-demand availability of computer system resources, such as data storage and computing power. In some examples, the cloud 120 provides resources without active management by the user 100. The term cloud is sometimes used to describe data centers available to many users 100 over the Internet. Some large cloud networks have functions distributed over multiple locations from central servers. A server is designated an edge server if it has a direct or close connection to a user 100. In some cases, a cloud 120 is limited to a single organization. In other examples, the cloud 120 is available to many organizations. In one example, a cloud 120 includes a multi-layer communications network comprising multiple edge routers and core routers. In another example, a cloud 120 is based on a local collection of switches in a single physical location.

Figure 2:
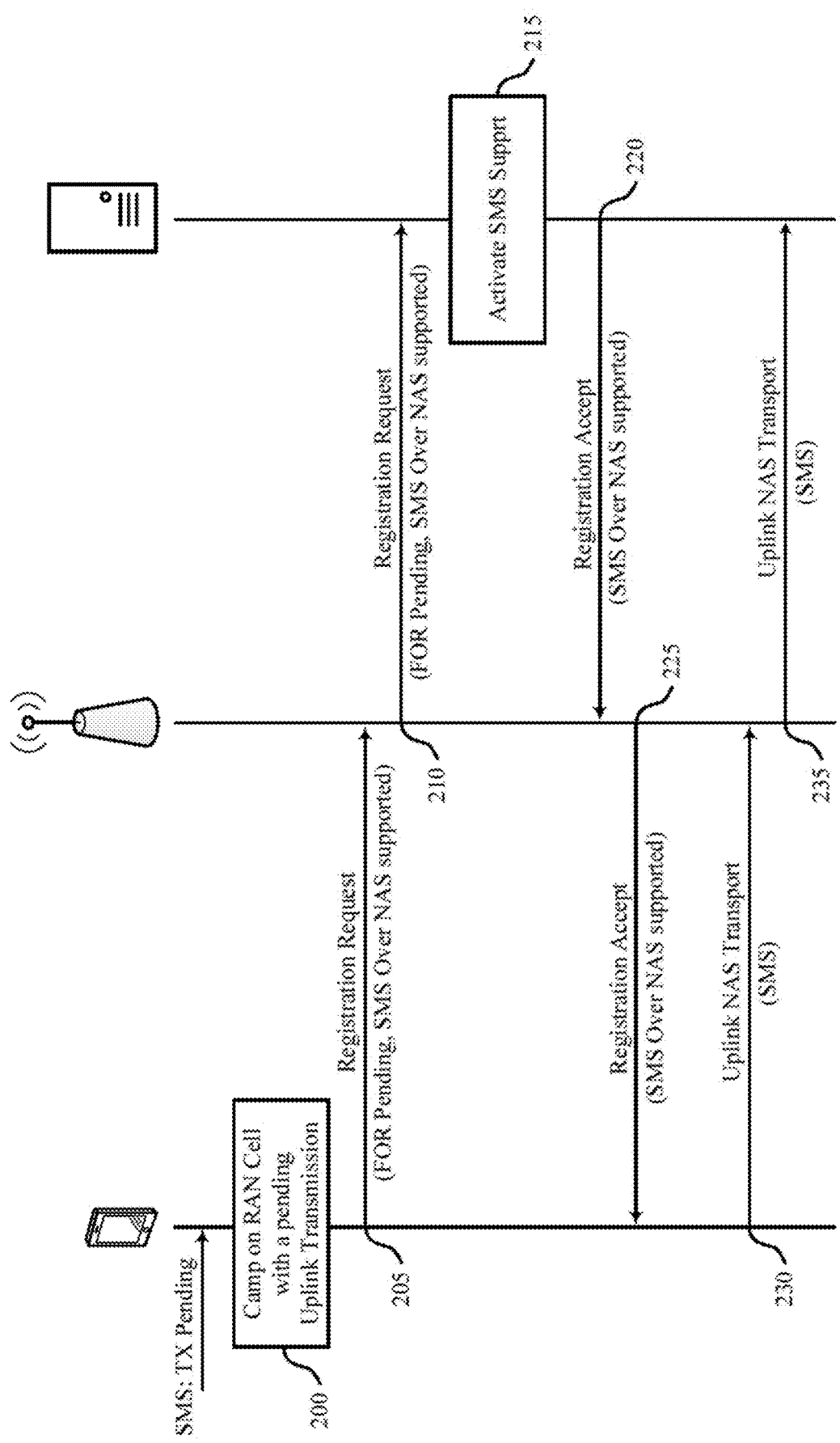
FIG. 2 shows an example of a flow diagram for availing services from a network supporting user equipment (UE) requested services, according to aspects of the present disclosure.

FIG. 2 shows an example of a flow diagram for availing services (e.g., 5G services) from a network supporting UE requested services (e.g., "SMS over NAS" services) according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some embodiments, the UE may be camped on a NG-RAN. In some embodiments, the UE may be configured to set a Follow On Request indicator bit (e.g., FOR indicator bit) to "Follow on Request Pending" or "FOR Pending" as the UE includes at least one pending uplink message to be transmitted over NAS. Further the UE may be configured to transmit a registration request including the FOR bit set to "FOR Pending" and an SMS bit set to "SMS over NAS supported" for registering the UE for "SMS over NAS" services on the network.

An AMF of the network may be configured to support the "SMS over NAS" services and further may be configured to prolong a connection between the UE and the network as the UE may use the connection to transmit the at least one pending uplink message. In some embodiments, the at least one pending uplink message may be a SMS.

For instance, at operation 200, the system camps on a cell (e.g., a NG-RAN cell connected to 5GCN) with a pending SMS message (e.g., at the UE) to be transmitted. In some cases, the operations of this step refer to, or may be performed by, a UE as described with reference to FIGS. 1, 6, and 11.

At operation 205, the system transmits a registration request (e.g., a registration request with a FOR bit set to "FOR pending" and indicating "SMS Over NAS supported") to base station. In some cases, the operations of this step refer to, or may be performed by, a UE as described with reference to FIGS. 1, 6, and 11.

At operation 210, the system transmits a registration request (e.g., a registration request with a FOR bit set to "FOR pending" and indicating "SMS Over NAS supported") to AMF. In some cases, the operations of this step refer to, or may be performed by, a base station as described with reference to FIG. 1.

At operation 215, the system activates SMS support. In some cases, the operations of this step refer to, or may be performed by, an AMF as described with reference to FIG. 1.

At operation 220, the system transmits a registration accept message (e.g., a registration accept message indicating "SMS Over NAS supported") to base station. In some cases, the operations of this step refer to, or may be performed by, an AMF as described with reference to FIG. 1.

At operation 225, the system transmits a registration accept message (e.g., a registration accept message indicating "SMS Over NAS supported") to UE. In some cases, the operations of this step refer to, or may be performed by, a base station as described with reference to FIG. 1.

At operation 230, the system transmits the pending SMS message to base station using the signaling connection (e.g., transmit a SMS message via uplink NAS Transport). In some cases, the operations of this step refer to, or may be performed by, a UE as described with reference to FIGS. 1, 6, and 11.

At operation 235, the system transmits the pending SMS message to AMF (e.g., transmit a SMS message via uplink NAS Transport). In some cases, the operations of this step refer to, or may be performed by, a base station as described with reference to FIG. 1.

Figure 3:
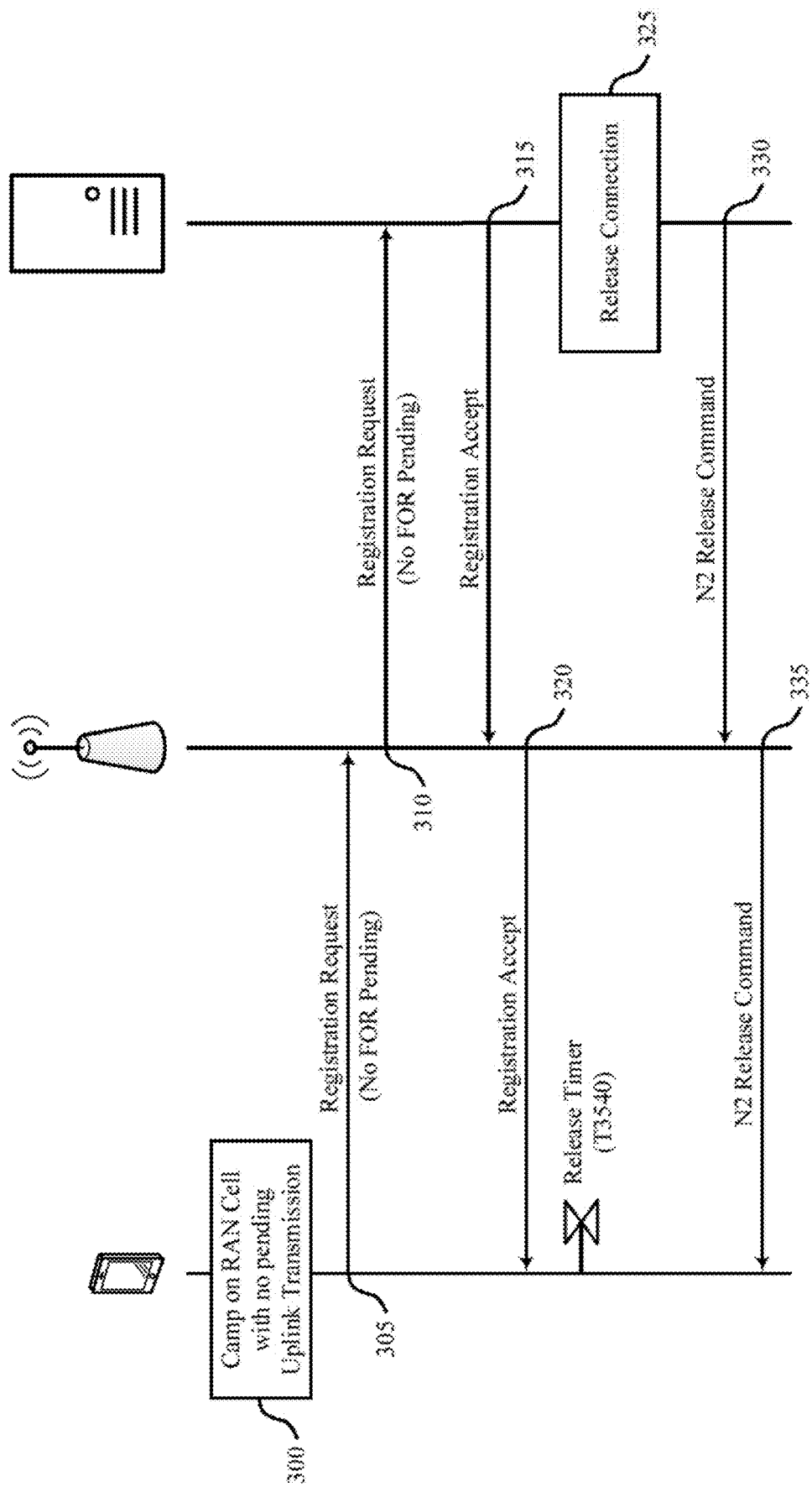
FIG. 3 shows an example of a flow diagram for availing services from a network that does not support UE requested services, according to aspects of the present disclosure.

FIG. 3 shows an example of a flow diagram for availing services (e.g., 5G services) from a network that does not support UE requested services (e.g., "SMS over NAS" services) according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some embodiments, the UE may be configured to set the FOR bit to "No Follow on Request Pending" as the UE may not include the at least one pending uplink message to be transmitted over the NAS. Further the UE may be configured to transmit the registration request including the FOR bit to the network. The AMF of the network may not prolong the connection between the UE and the network as the UE includes no pending uplink message to be transmitted over NAS. Further, the AMF may release the connection after completion of the registration and no pending down link message may be sent to the UE.

For instance, at operation 300, the system camps on a cell (e.g., a NG-RAN cell connected to 5GCN) with no pending uplink messages to be transmitted. In some cases, the operations of this step refer to, or may be performed by, a UE as described with reference to FIGS. 1, 6, and 11.

At operation 305, the system transmits a registration request (e.g., a registration request with a FOR bit set to "No FOR pending") to base station. In some cases, the operations of this step refer to, or may be performed by, a UE as described with reference to FIGS. 1, 6, and 11.

At operation 310, the system transmits a registration request (e.g., a registration request with a FOR bit set to "No FOR pending") to AMF. In some cases, the operations of this step refer to, or may be performed by, a base station as described with reference to FIG. 1.

At operation 315, the system transmits a registration accept message to base station. In some cases, the operations of this step refer to, or may be performed by, an AMF as described with reference to FIG. 1.

At operation 320, the system transmits a registration accept message to UE. In some cases, the operations of this step refer to, or may be performed by, a base station as described with reference to FIG. 1.

At operation 325, the system starts a release timer (e.g., a T3540 timer). In some cases, the operations of this step refer to, or may be performed by, a UE as described with reference to FIGS. 1, 6, and 11.

At operation 330, the system releases the connection. In some cases, the operations of this step refer to, or may be performed by, an AMF as described with reference to FIG. 1.

At operation 335, the system transmits a release command (e.g., a N2 release command) to base station. In some cases, the operations of this step refer to, or may be performed by, an AMF as described with reference to FIG. 1.

At operation 340, the system transmits a release command (e.g., R(AN) release command) to UE. In some cases, the operations of this step refer to, or may be performed by, a base station as described with reference to FIG. 1.

Figure 4:
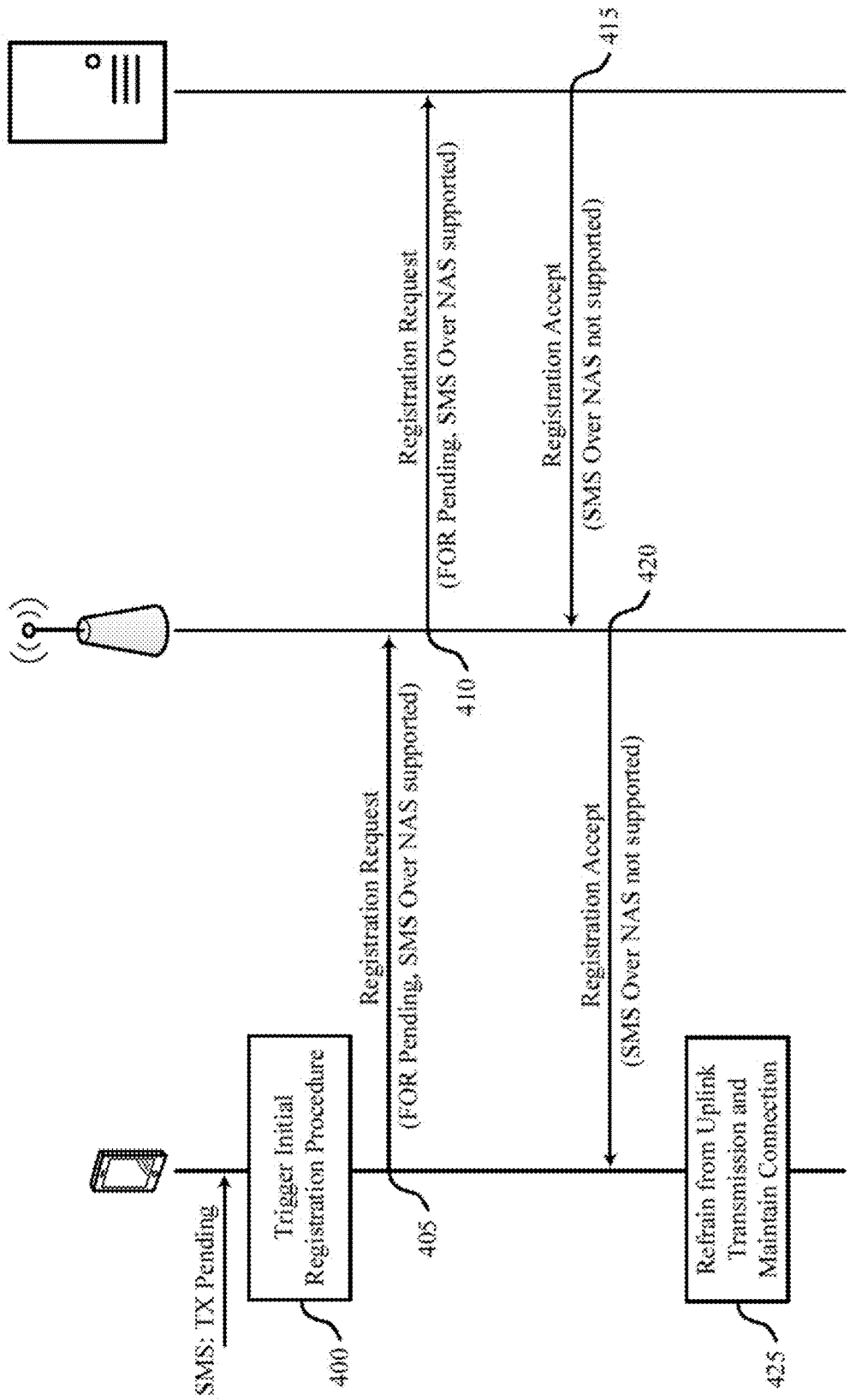
FIG. 4 shows an example of a flow diagram for UE registration on a network for availing services of the network, according to aspects of the present disclosure.

FIG. 4 shows an example of a flow diagram for UE registration on a network for availing services (e.g., 5G services) of the network according to aspects of the present disclosure.

At 400, a UE may have a pending uplink transmission (e.g., a pending SMS transmission), and the UE may trigger an initial registration procedure and indicate that SMS over NAS is supported by the UE in a SMS request bit (e.g., the UE may set a SMS bit to "SMS over NAS supported" for registering the UE for "SMS over NAS" services on the network).

At 405, the UE may transmit or signal a registration request to an AMF of the network (e.g., via a base station of the network). For instance, in some embodiments, the registration request may be transmitted through the base station, which may include a next generation nodeB (gNB) to the 5G network. Further, the registration request may include a FOR bit set to "FOR Pending" for indicating the presence of at least one pending uplink message to be transmitted. In some embodiments, the at least one pending uplink message may be transmitted over a NAS. In addition to the FOR bit set to "FOR Pending", the registration request may also include a SMS bit set to "SMS over NAS supported" for registering the UE for "SMS over NAS" services on the network.

At 410, the base station may transmit the registration request, and the registration request may be received at the AMF associated with the 5G network. Upon receiving the registration request at the AMF, the process may include processing the registration request for determining presence of the at least one pending uplink message at the UE based on the FOR bit set to "FOR Pending".

At 415, the network may have accepted the registration request from the UE, and the AMF may generate and transmit a registration accept message to the UE as a response for the registration request. Specifically, the AMF may transmit a registration accept message to the base station such that the base station may relay the registration accept message to the UE. Further, the registration accept message may include a bit "SMS over NAS not allowed" indicating that the network may not support the "SMS over NAS." For instance, an SMS allowed bit of an IE (e.g., the 5GS registration result IE) may be set to "SMS over NAS not supported".

At 420, the base station may relay the registration accept message to the UE. Based on the "SMS over NAS not supported", the UE may not use the "SMS over NAS" with the network as currently registered. Further, the UE may not start a release timer (e.g., timer T3540) and the AMF may not release the connection immediately.

As such, at 425, the UE may refrain from uplink transmission and maintain connection with the network. In some cases, the UE may remain in connected mode for an extended duration. Further, there is no knowledge to the network for which pending uplink signaling UE has set the Follow on indicator to "Follow on indicator pending". In other words, the UE may not transmit SMS messages in the present registered network, however the UE also may not start a release timer (e.g., T3540) for releasing the N1 NAS signaling connection because the FOR bit of the registration request is set to "FOR Pending" at 405 and 410. Accordingly, radio resources may be wasted, and UE battery power may also be wasted in a connected mode.

Figure 5:
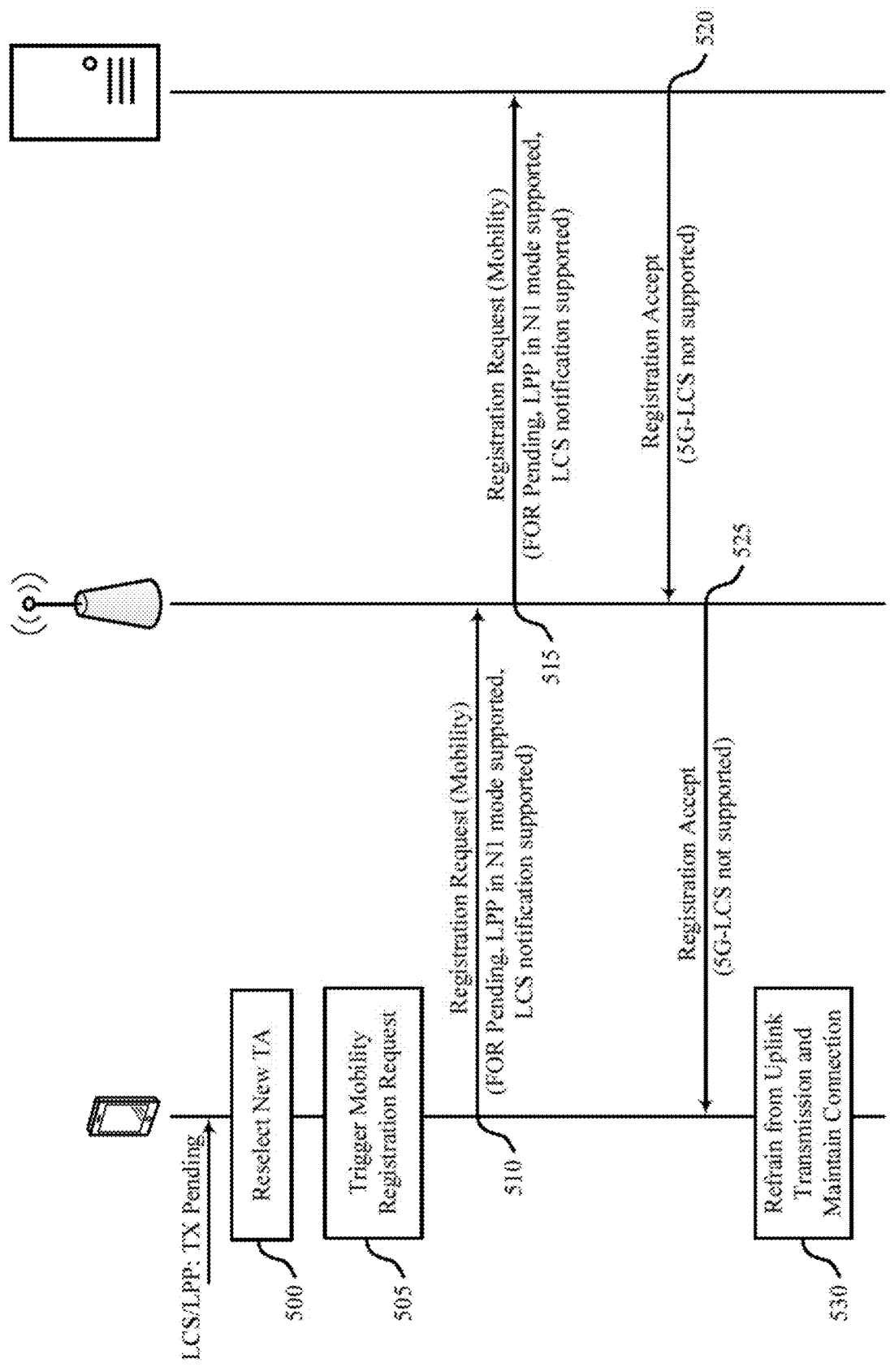
FIG. 5 shows an example of a flow diagram for a UE sending a mobility registration request to a network for availing services of the network, according to aspects of the present disclosure.

FIG. 5 shows an example of a flow diagram for a UE sending a mobility registration request to a network for availing services (e.g., 5G services) of the network according to aspects of the present disclosure.

At 500, a UE may have a pending uplink transmission (e.g., a pending LPP/LCS uplink message transmission), and the UE may reselect a new TA (e.g., a current cell in the TA may not be present in registered area list of the network). At 505, the UE may have a pending uplink transmission (e.g., pending LPP/LCS uplink messages) and may trigger a mobility registration request. At 510, the UE may set the FOR bit to "FOR Pending" and the UE may send the mobility registration request to a base station. In some embodiments, the mobility registration request may include the FOR bit set to "FOR Pending" for indicating the presence of the at least one pending uplink message to be transmitted. In addition to the FOR bit, the registration request may also include a bit set to "LPP in N1 mode supported" and another bit set to "LCS notification supported" for transmitting the at least one pending uplink message. At 515, the base station may relay the mobility registration request to an AMF of the network.

At 520, upon network receipt of the mobility registration request, the process may include processing the registration request for determining presence of the at least one pending uplink message at the UE based on the FOR bit set to "FOR Pending". The AMF may accept the mobility registration request form the UE, and the AMF may transmit a registration accept message to the base station (e.g., to be relayed to the UE via the base station) as a response for the registration request. Further, the registration accept message may include a bit "5G LCS not supported" indicating that the network may not support 5G LCS services. At 525, the base station may relay the registration accept message to the UE.

Further, the UE may not the start timer T3540 and the AMF may not release the connection immediately. For instance, at 530, the UE may refrain from uplink transmission and may maintain in connection. In some cases, the UE may remain in connected mode for extended duration. Further, there is no knowledge to the network for which pending uplink signaling UE has set the Follow on indicator to "Follow on indicator pending". In other words, the UE may not transmit LCS/LPP messages in a present registered network, and the UE may not start a release timer (e.g., T3540) for releasing a N1 NAS signaling connection as the FOR bit is set to "FOR Pending". As such, radio resources may be inefficiently utilized, or may be wasted, and a UE battery power may also be inefficiently utilized (e.g., or wasted) in a connected mode.

Figure 6:
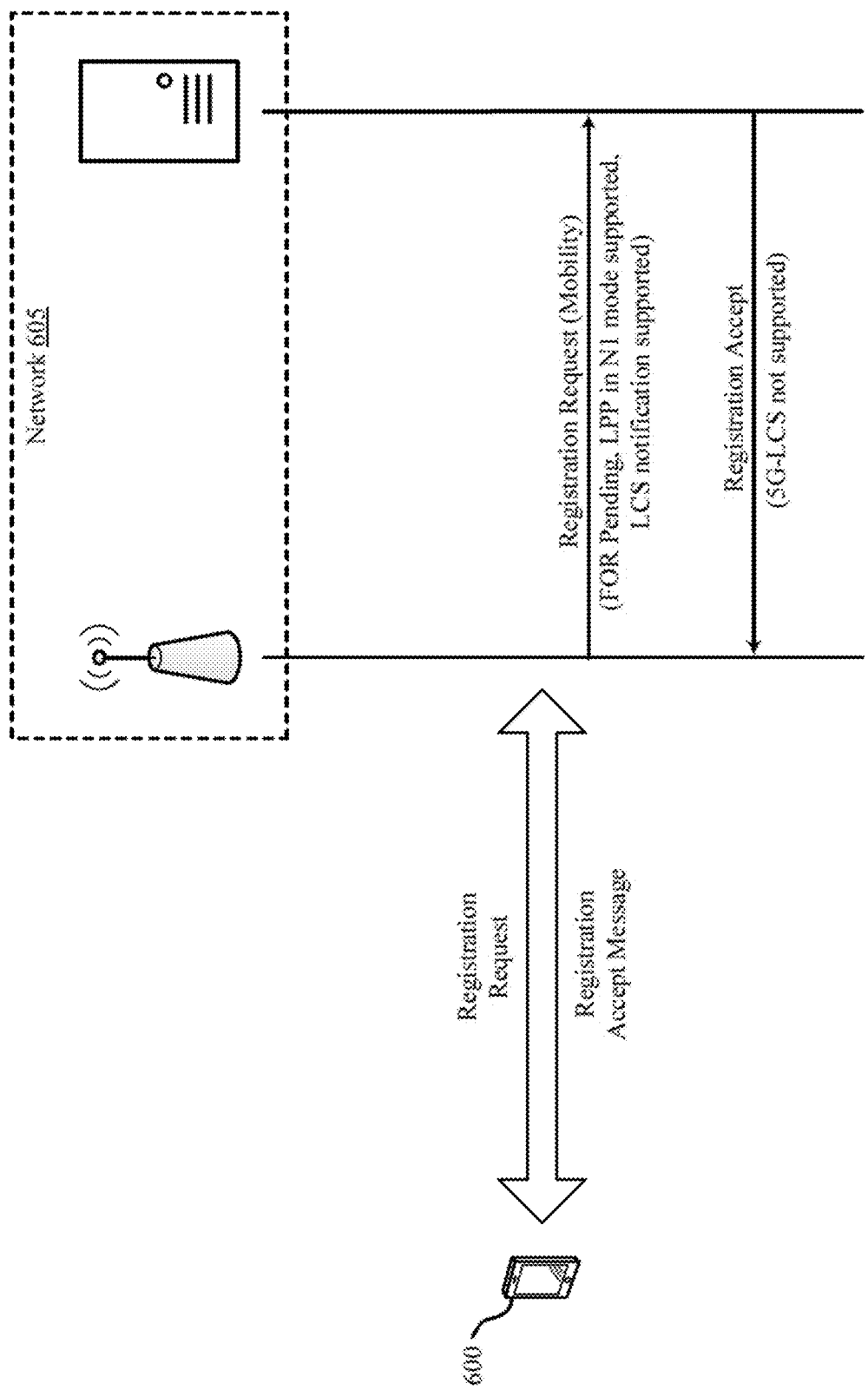
FIG. 6 shows an example of a communication environment including a UE and a network providing services, according to aspects of the present disclosure.

FIG. 6 shows an example of a communication environment including a UE 600 and a network 605 providing services (e.g., 5G services) according to aspects of the present disclosure. The example shown includes UE 600 and network 605. UE 600 is an example of, or includes aspects of, the corresponding element described with reference to FIGS. 1 and 11. Network 605 may include a base station and an AMF, which may be examples of the corresponding elements described with reference to FIG. 1.

FIG. 6 illustrates a communication environment including a UE 600 and a network 605 providing 5G services, in accordance with one or more embodiments of the techniques described herein. In some embodiments, the UE 600 may be configured to connect to the network 605 and transmit at least one pending uplink message as an uplink signal. In some embodiments, the UE 600 may be connected to the network 605 through a cell related to NG RAN. In some embodiments, the UE 600 may be configured to communicate with an AMF of the network 605 through a base station (e.g., a gNB) connected to the network 605. In some embodiments, the connection between the UE 600 and the network 605 may be an N1 NAS signaling connection. In some embodiments, the at least one pending uplink message may be one or more of one or more of a SMS, LCS/LPP, and an IMS service.

According to one or more aspects of the techniques described herein, the UE 600 may be configured to transmit a request to the network 605 in order to release the at least one pending uplink message. In some embodiments, the request may be a registration request, a mobility registration request, and another mobility registration request including a FOR bit set to "Follow on Request Pending" indicating presence of the at least one pending uplink message. In some embodiments, the request may include the FOR bit set to "No Follow On Request Pending" indicating absence of the at least one pending uplink message.

Continuing with the above embodiment, the network 605 upon receiving the registration request may be configured to transmit a registration accept message to the UE 600. In some embodiments, the registration accept message may indicate that the network 605 includes no support for the least one pending uplink message. Based on the indication provided by the registration accept message, the UE 600 may be configured to perform one of releasing the N1 NAS signaling between the UE 600 and the network 605 and initiating one of an implementation dependent timer and a release timer (e.g., a T3540 timer). In some embodiments, the implementation dependent timer may be configured, for example, between 0 second to 10 seconds and a default value related to the release timer may be 10 seconds. Further, in some embodiments, where it is determined that the implementation dependent timer is not configured to any value between 0 second to 10 seconds, the implementation dependent timer may be configured with the default value of the release timer.

FIGS. 7-10 illustrate flowcharts (e.g., operational diagrams) depicting one or more processes for a UE for availing services (e.g., 5G services) of a network, in accordance with one or more embodiments of the techniques described herein. In some embodiments, the UE may be operated in NG-RAN cell connected to 5GCN for availing the 5G services of the network. In some embodiments, the UE may include at least one pending uplink message to be transmitted. In some embodiments, the at least pending uplink message may be any of a SMS, a LCS/LPP, and an IMS service. In some embodiments, for connecting to the network, the UE may be configured to communicate with an AMF of the network through a base station (e.g., a gNB) connected to the network.

In some embodiments, circled continuity indicators (A', B', and 'C') in the examples of FIGS. 7-10 may indicate an order of operations of a procedure that includes one or more aspects of FIGS. 7-10 (e.g., a process for a UE availing 5G services of a network may include operations of FIGS. 7-10 performed sequentially). In other embodiments, operations shown in any of FIGS. 7-10 may be performed independently.

Figure 7:
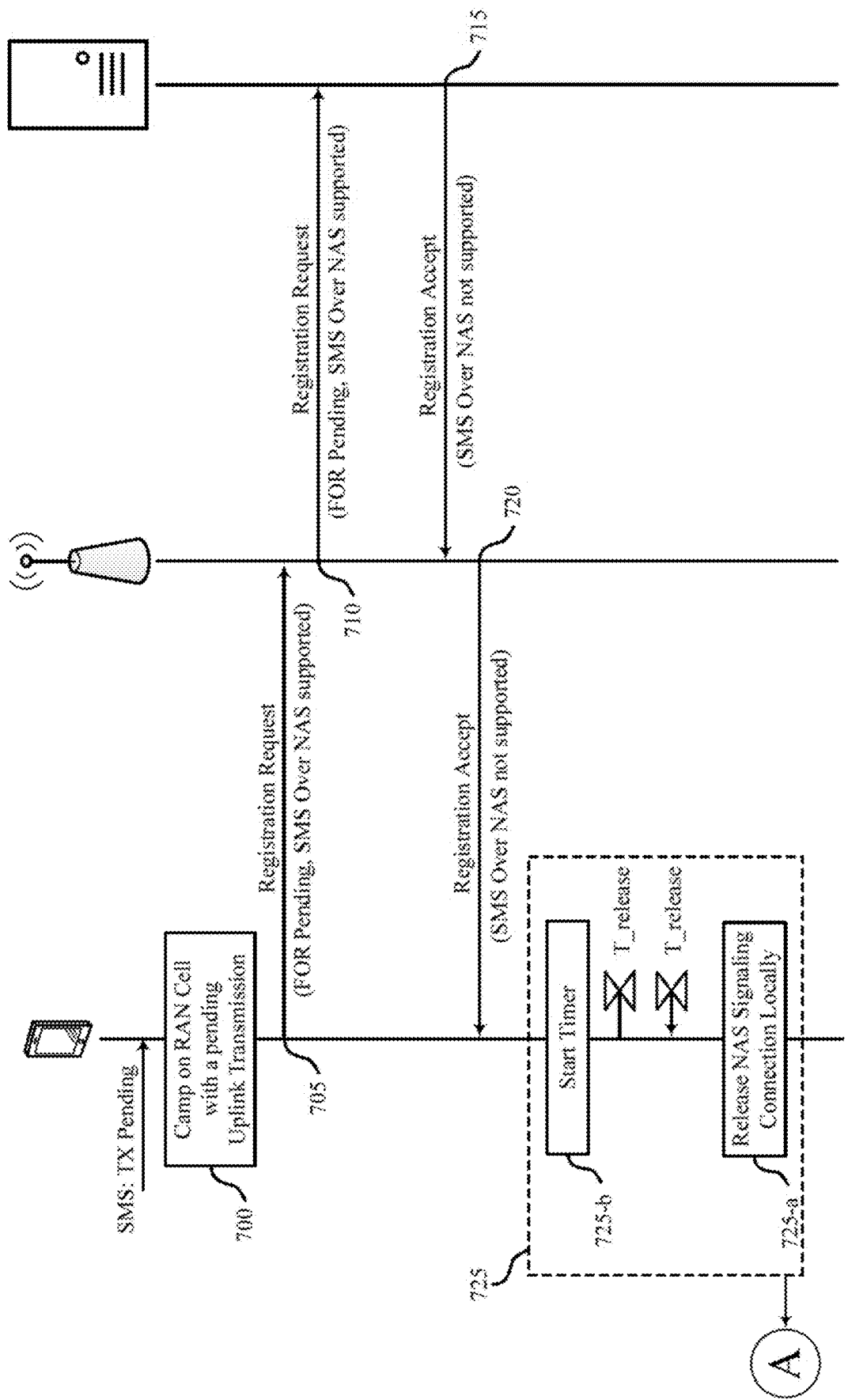
FIGS. 7 through 10 show examples of a flowchart for availing services of a network according to aspects of the present disclosure.

FIG. 7 shows an example of a flowchart for availing services of a network according to aspects of the present disclosure.

At 700, a UE may be powered on, may be camping on a cell (e.g., a NG-RAN cell connected to the 5GCN), and may have pending uplink transmissions (e.g., may have pending SMS to be transmitted).

At 705, the UE may transmit a registration request to a base station of the network (e.g., to be relayed to an AMF of the network). The registration request may include an IE including a FOR bit set to "FOR Pending" for indicating the presence of the at least one pending uplink message to be transmitted. In some embodiments, the at least one pending uplink message may be a pending SMS message transmission and further may be transmitted over a NAS. In addition to the FOR bit, the IE may also include a SMS bit set to "SMS over NAS supported" for registering the UE for "SMS over NAS" services on the network.

At 710, the base station may transmit the registration request to an AMF of the network. Upon receiving the registration request, the AMF may process the registration request for determining presence of the at least one pending uplink message at the UE based on the registration request including the FOR bit set to "FOR Pending".

At 715, the AMF generates a registration accept message for the UE, as a response to the registration request, upon accepting the registration request from the UE. Further, the registration accept message may include a bit "SMS over NAS not allowed" indicating that the network may not support the "SMS over NAS" such that the network may fail to activate a support for the "SMS over NAS".

At 720, the base station may relay the registration accept message to the UE. Upon receiving the registration accept message, the UE may be configured to ascertain that the network may not be capable to process the at least one pending uplink message. In some embodiments, the UE may be configured to ascertain based on the "SMS over NAS not allowed" bit received from the network.

After ascertaining, at the UE, that the network is incapable of processing the at least one pending uplink message, the process may proceed to 725. At 725, the UE may perform, to release the NAS signaling connection, one of: releasing the NAS signaling connection between the UE and the network (e.g., at 725-a) or initiating one of the implementation dependent timer and the release timer (e.g., at 725-b).

For example, at 725-a, the process may include releasing a N1 NAS signaling connection between the UE and the network. In some embodiments, the N1 NAS signaling connection may be a connection between the UE and the network. In some embodiments, the N1 NAS signaling connection may be based on camping of the UE at a cell related to the NG-RAN of the network.

At step 725-b, the process may proceed towards initiating one of an implementation dependent timer and a release timer (e.g., a T3540 timer) to release the N1 NAS signaling connection. In some embodiments, the implementation dependent timer may be configured, for example, between 0 second to 10 seconds and a default value related to the release timer (T3540 timer) may be, for example, 10 seconds. Further, in some embodiments, where it is determined that the implementation dependent timer is not configured to any value between 0 second to 10 seconds, the implementation dependent timer may be configured with the default value of the release timer (T3540 timer).

Figure 8:
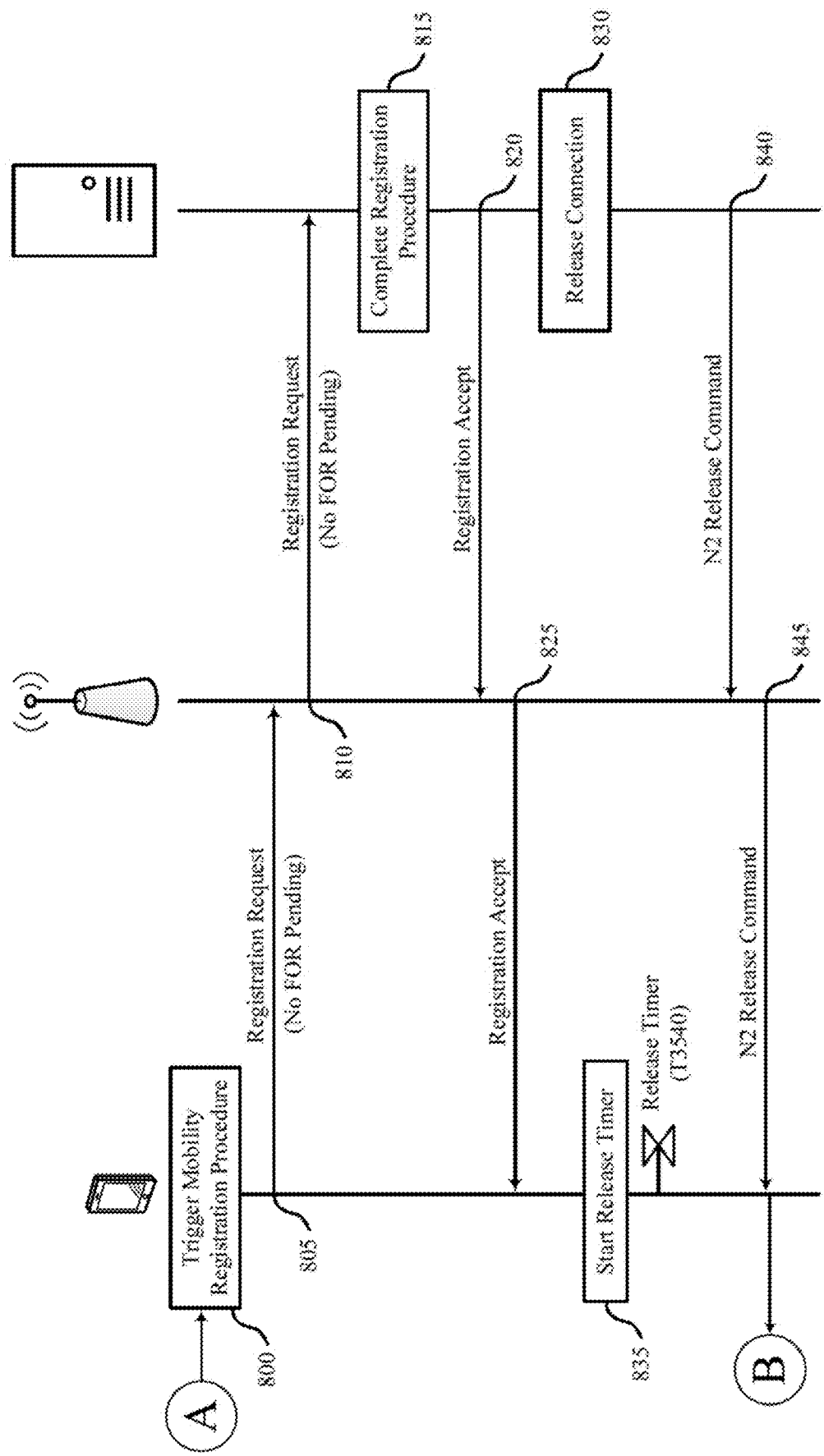

FIG. 8 shows an example of a flowchart for availing services of a network according to aspects of the present disclosure.

At 800, a UE may trigger a mobility registration procedure to indicate to the network that no Follow On Request (FOR) is pending as pending SMS can be uplinked. In some examples, the operation at 800 may occur after the operation 725 described with reference to FIG. 7. In other examples, the operation at 800 may be performed independently of the operations described with reference to FIG. 7.

At 805, the UE may transmit a registration request to a base station of the network. For instance, upon ascertaining that the network may not be configured to provide the support for the "SMS over NAS" and release of the N1 NAS signaling connection upon finishing of any of the implementation dependent timer and the release timer, a mobility registration request may be transmitted from the UE to the network (e.g., the base station) at 805. In some embodiments, the mobility registration request at 805 may be sent following any of the preceding operations (e.g., such as 725-a and/or 725-b). In some embodiments, the mobility registration request may include the FOR bit set to "No FOR Pending" in the IE of the mobility registration request. In some embodiments, the FOR bit set to "No FOR Pending" may indicate an absence of the at least one pending uplink message to be transmitted to the network.

At 810, the base station may relay the registration request to an AMF of the network (e.g., the AMF of the network may receive the mobility registration request with the FOR bit set to "No FOR Pending"). At 815, the network (e.g., the AMF) may complete the registration procedure.

At 820, the AMF may generate a mobility registration accept message for the UE, and the AMF may transmit the mobility registration accept message to the base station (e.g., to be relayed to the UE via the base station). In some embodiments, the mobility registration accept message may indicate a successful mobility registration of the UE at the network. At 825, the base station may relay (e.g., transmit) the mobility registration accept message to the UE.

At 830, the AMF may release the connection (e.g., based at least in part on transmitting the registration accept message at 820). At 835, the UE may start a release timer (e.g., a T3540 timer). At 840, the AMF may generate a release command (e.g., a N2 release command) for the connection with the UE, and the AMF may transmit the release command to the base station. At 845, the base station may relay (e.g., transmit) the release command to the UE. In some examples, the N1 NAS signaling connection between the UE and the network may thus be released (e.g., at 845). In some embodiments, the N1 NAS signaling connection may be the connection between the UE and the network. In some embodiments, the N1 NAS signaling connection may be based on camping of the UE at a cell related to the NG-RAN of the network.

Figure 9:
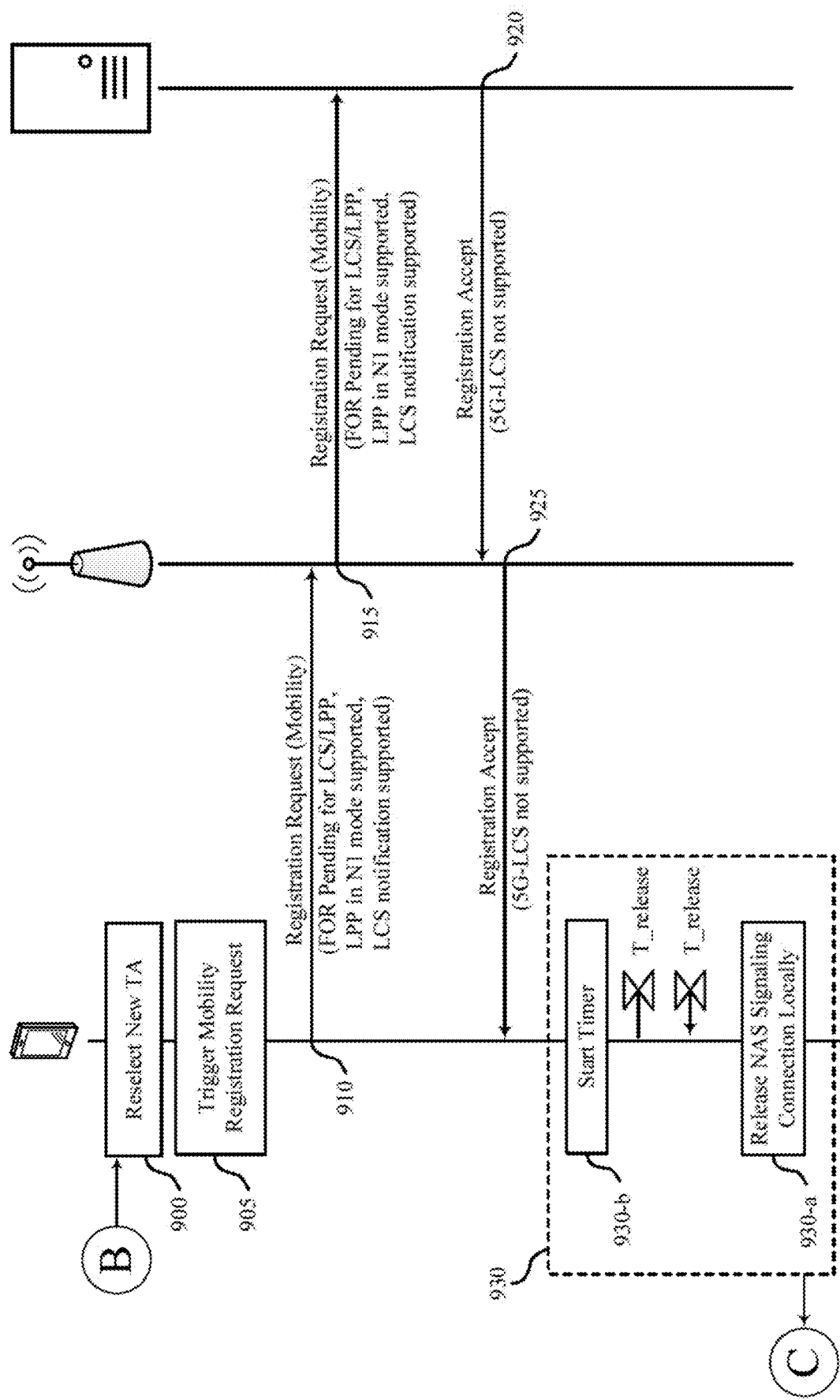

FIG. 9 shows an example of a flowchart for availing services of a network according to aspects of the present disclosure.

At 900, a UE may reselect a new TA (e.g., the current cell TA may not be present in the registered area list). In some examples, the operation at 900 may occur after the operation 845 described with reference to FIG. 8. For instance, upon the mobility registration of the UE at the network, the process may proceed towards re-selecting a new TA by the UE registered in the network in an idle mode. In some embodiments, the re-selection of the TA is performed as a current cell TA is not present in a registered area list. In some embodiments, the registered area list may include one or more cells present in the TA. In some examples, the operation at 900 may be performed independently of the operations described with reference to FIG. 8.

At 905, the UE may trigger a mobility registration request. For example, the UE may have pending LPP/LCS uplink signaling messages and the UE may trigger mobility registration request. The UE may set a FOR bit to "FOR Pending for LCS/LPP", and the UE may transmit the mobility registration request to the base station (e.g., at 910). That is, the process may include sending another mobility registration request upon the re-selection of the TA. In some embodiments, the other mobility registration request may be transmitted from the UE to the AMF (e.g., via transmitting the other mobility registration request to the base station at 910, and the base station relaying the other mobility registration request to the AMF at 915). In some embodiments, the UE may include the at least one pending uplink message.

The registration request may include the IE containing a FOR bit set to "FOR Pending" for indicating the presence of the at least one pending uplink message to be transmitted. In some embodiments, the at least one pending uplink message may be an LPP/LCS uplink message and further may be transmitted over the NAS. In addition to the FOR bit, the IE may also include a "LPP in N1 mode supported" bit and "LCS notification supported" bit indicating presence of the LPP/LCS uplink messages.

At 920, in response to receiving the other mobility registration request, the AMF may transmit a registration accept message to the base station. At 925, the base station may transmit the registration accept message to the UE. The registration accept message (e.g., at 920 and 925) may include a bit "5G-LCS not supported" indicating that the network may not support the location services via 5G.

At 930, the process may include the network releasing (step 426) the N1 NAS signaling connection between the UE and the network. Further, the network may release the N1 NAS signaling upon determining that there is no downlink message to be transmitted. Further, in some embodiments, where it is determined that the network is still connected to the UE, the process may include performing one (e.g., or in some cases both) of 930-a and 930-b. At 930-a, the process includes releasing the N1 NAS signaling connection between the UE and the network by the UE. At 930-b, the process may proceed towards initiating one of the implementation dependent timer and the release timer (e.g., the T3540 timer) to release the N1 NAS signaling connection by the UE. In some embodiments, the UE may release the N1 NAS signaling upon determining that the network is connected to the UE after the completion of the one of the implementation dependent timer and the release timer (e.g., the T3540 timer).

Figure 10:
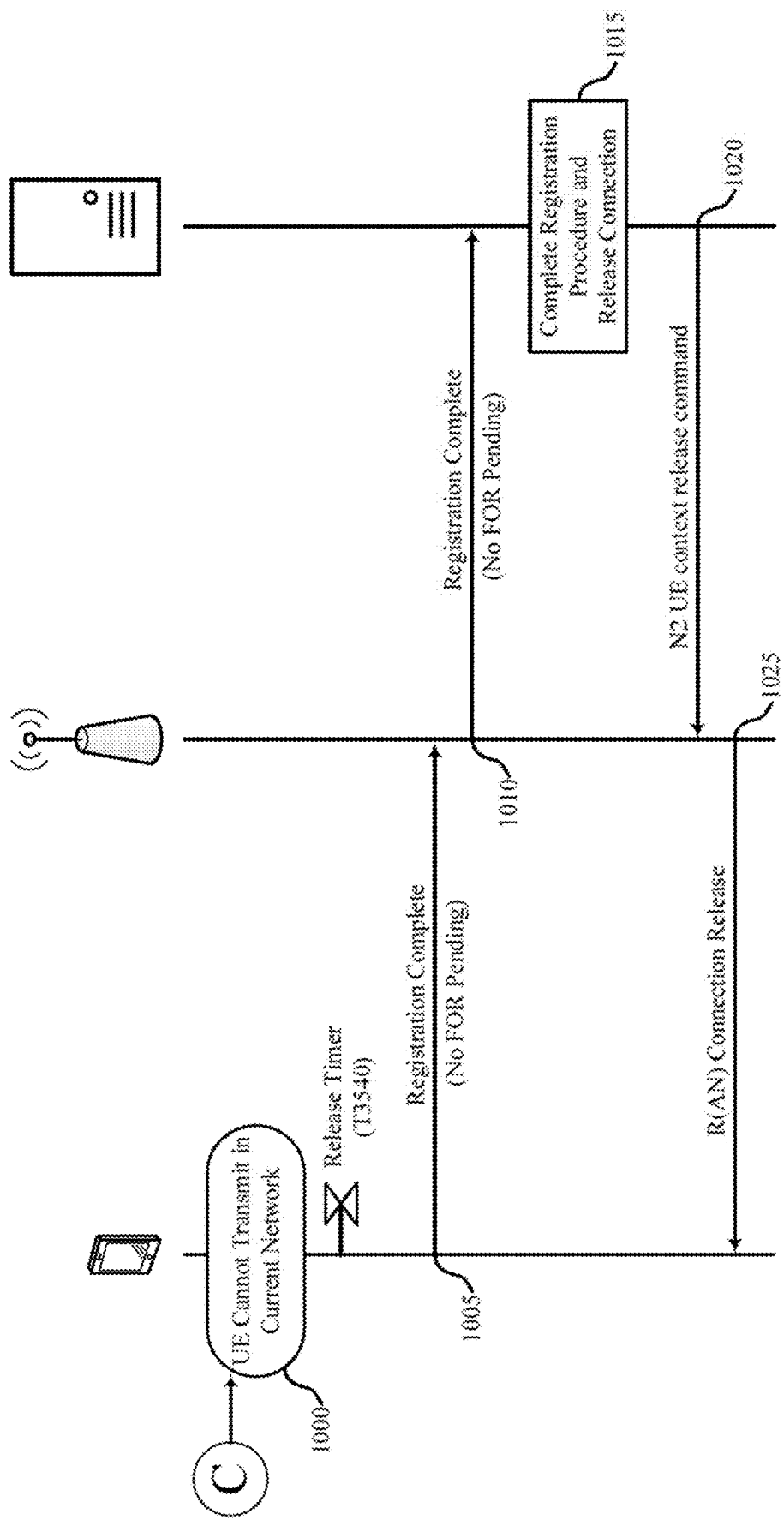

FIG. 10 shows an example of a flowchart for availing services of a network according to aspects of the present disclosure.

At 1000, the UE may not transmit SMS messages in the current registered network. In some examples, the operation at 1000 may occur after the operation 930 described with reference to FIG. 9. In other examples, the operation at 1000 may be performed independently of the operations described with reference to FIG. 9.

At 1005, the UE may transmit a registration complete message to the network (e.g., to the AMF of the network via relaying the registration complete message through the network base station). In some embodiments, the registration complete message may be transmitted if it is determined that the network may not be configured to support the at least one pending uplink message at the UE to be transmitted. For instance, at 1005 the UE may transmit the registration complete message to the base station, and at 1010 the base station may relay (e.g., transmit) the registration complete message to the AMF. In some embodiments, the registration complete message may include another IE with FOR bit set to "No FOR Pending". Further, the UE may initiate one of the implementation dependent timer and the T3540 timer.

At 1015, the network (e.g., the AMF) may complete the registration procedure and release the connection with the UE. At 1020, the AMF may generate a release command (e.g., a N2 UE context release command) for the UE and transmit the release command to the base station. At 1025, the base station may relay or transmit the release command (e.g., R(AN) connection release) to the UE.

For example, upon receiving the registration complete message with the other IE, the network (e.g., the AMF) may release the N1 NAS signaling. In some embodiments, the N1 NAS signaling may be released when it is determined that the network includes no downlink message to be transmitted. Further, in some embodiments, where it is determined that the network is still connected to the UE, the UE may release the N1 NAS connection upon completion of the one of the implementation dependent timer and the release timer (e.g., the T3540 timer).

In some embodiments, upon detecting that the network may not process the at least one pending uplink message, the UE may be configured to send an Uplink (UL) NAS Transport message by the UE to the network. In some embodiments, the UL NAS Transport message may include a release assistance IE. Further, the release assistance IE may include a DDX field set to 1 indicating No further uplink and no further downlink data transmission subsequent to the uplink data transmission is expected". Upon receiving the UL NAS Transport message, the network may be configured to release the N1 NAS signalling connection between the UE and the network.

In some embodiments, the UE may indicate to the network a type of the at least one pending uplink message based on a type of service in an optional IE in the other mobility registration request. In some embodiments, the type of the at least one uplink message may be indicated when the FOR bit is set to "one". In some embodiments, the optional IE may indicate the network, the type of service. In some embodiments, the service may be indicated in a bitwise manner in the IE. In some embodiments, the at least one pending uplink signal may be defined as one or more of a Least Significant Bit (LSB) $0^{th}$ bit, a LSB $1^{ST}$ bit, a LSB $2^{nd}$ bit, and a combination of the LSB $0^{th}$ bit and the LSB $1^{st}$ bit.

In some embodiments, the LSB $0^{th}$ bit may include "SMS" if the at least one pending uplink signaling is associated with the SMS service. Further, the LSB $1^{st}$ bit may include LCS/LPP" if the at least one pending uplink signaling is associated with the LCS/LPP service. Moving forward, the LSB $2^{nd}$ bit may include "IMS signaling" if the at least one pending uplink signaling is associated with the IMS service.

In some embodiments, where it is determined that the UE includes a number of pending uplink messages to be transmitted in the registration request and the network is configured to support at least one of the number of pending uplink messages, the UE may be configured to discard the pending uplink messages not supported by the network upon receiving the registration accept message from the network.

Further, in some embodiments where it is determined that the network includes the support for the at least one pending uplink message by the UE, the UE may not release the N1 NAS signaling connection. Further, the UE may process the supported the at least pending uplink message with the existing N1 NAS signaling connection.

Table 1 below illustrates a number of bits corresponding to the at least pending uplink message.

TABLE 1

Follow-on request for uplink signaling

| Bit 3 bits | | | |
|---|---|---|---|
| 3 | 2 | 1 | |
| 0 | 0 | 1 | "Follow-on request pending for SMS over NAS" |
| 0 | 1 | 0 | "Follow-on request pending for LCS/LPP" |
| 1 | 0 | 0 | "Follow-on request pending for IMS signaling" |
| 0 | 1 | 1 | "Follow-on request pending for other pending uplink signaling" |

Figure 11:
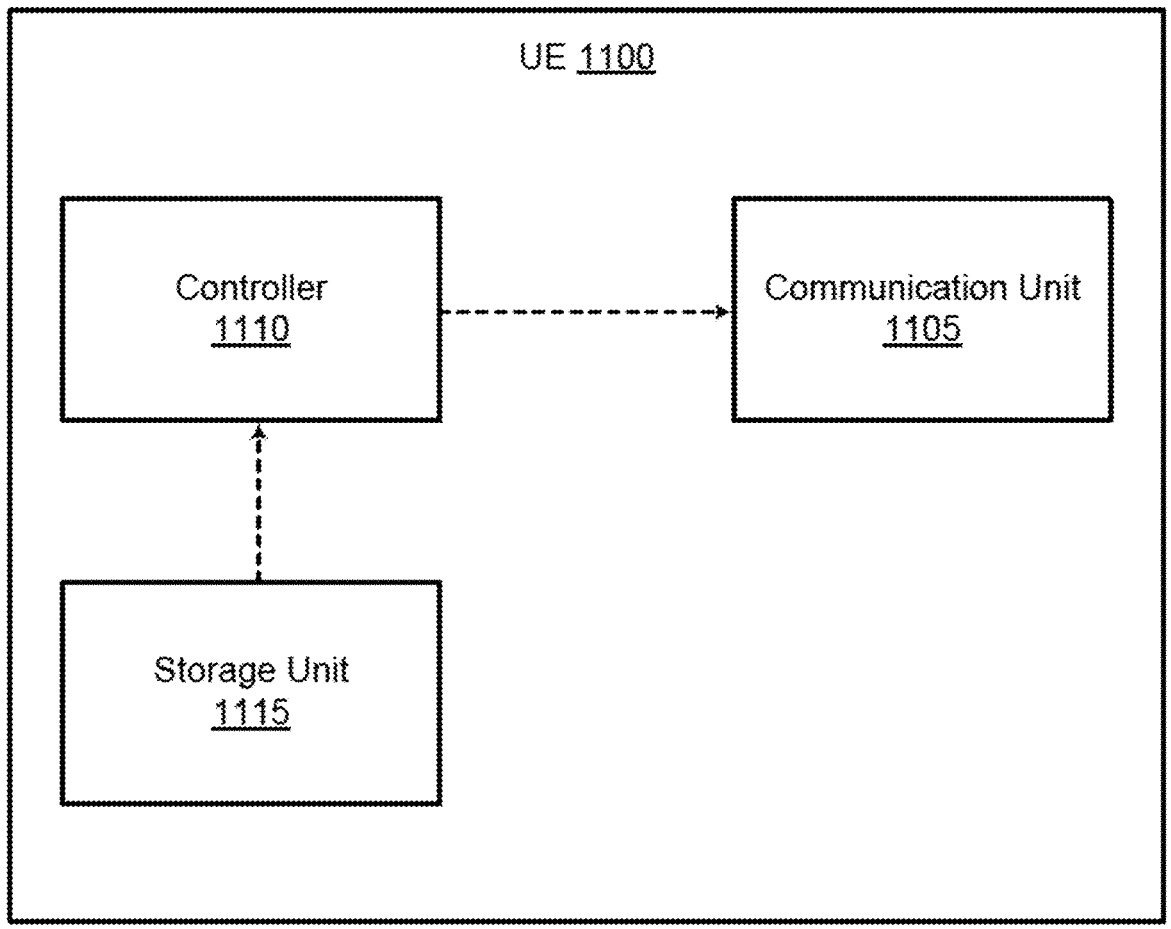
FIG. 11 shows an example of a block diagram of a UE according to aspects of the present disclosure.

FIG. 11 shows an example of a block diagram of a UE 1100 according to aspects of the present disclosure. UE 1100 is an example of, or includes aspects of, the corresponding element described with reference to FIGS. 1 and 6. In one embodiment, UE 1100 includes communication unit 1105, controller 1110, and storage unit 1115.

In some examples, communication unit 1105 may include or implement aspects of a transceiver. A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem.

A controller 1110 may include or implement aspects of a processor. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller 1110. In other cases, a memory controller 1110 is integrated into the processor. In some cases, the processor is configured to execute computer-readable instructions stored in a memory to perform various functions. In some embodiments, a processor includes special purpose components for modem processing, baseband processing, digital signal processing, or transmission processing.

In some examples, controller 1110 may implement or control some control circuitry. Control circuitry may be based on any suitable processing circuitry such as processing circuitry. As referred to herein, processing circuitry should be understood to mean circuitry based on one or more microprocessors, microcontrollers, digital signal processors, programmable logic devices, FPGAs, ASICs, etc., and may include a multi-core processor (e.g., dual-core, quadcore, hexa-core, or any suitable number of cores) or supercomputer. In some embodiments, processing circuitry may be distributed across multiple separate processors or processing units, for example, multiple of the same type of processing units or multiple different processors. In some embodiments, control circuitry executes instructions for applications stored in memory (i.e., storage unit 1115). Specifically, control circuitry may be instructed by the controller 1110 or an application to perform the functions discussed herein.

In some examples, one or more aspects of the techniques described herein may be implemented using software. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

Memory may be an electronic storage device provided as storage that is part of control circuitry. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLURAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage may be used to store various types of content described herein as well as media guidance data described above. Nonvolatile memory may also be used (e.g., to launch a boot-up routine and other instructions).

FIG. 11 illustrates a schematic block diagram of a UE 1100, in accordance with one or more embodiments of the techniques described herein. In some aspects, the configuration (e.g., the operations, steps, etc.) of FIGS. 7-10 may be understood as being a part of the configuration of the UE 1100. Hereinafter, it is understood that terms including "unit" or "er" at the end may refer to the unit for processing at least one function or operation and may be implemented in hardware, software, or a combination of hardware and software. In some embodiments, the UE 1100 upon powering on may be configured to camp onto a NG RAN cell connected to a network. In some embodiments, the network may provide 5G services. Examples of the UE 1100 may include, but are not limited to, a smart phone, a cellular phone, a Personal Computer (PC), a laptop, a tablet, or any device capable of communicating over a cellular network such as 4G, 5G, or the like. In some embodiments, the UE 1100 may include a communication unit 1105 (e.g., communicator or communication interface), a storage unit 1115 (e.g., storage), and a controller 1110 (e.g., at least one processor).

The communication unit 1105 may perform functions of communicating with an AMF of the network. In some embodiments, the communication unit 1105 may be configured to transmit a registration request, a mobility registration request, and another mobility registration request to the network. In some embodiments, the communication unit 1105 may further be configured to transmit a registration complete message to the network. In response to transmitting the registration request, the mobility registration request, and the other mobility registration request, the communication unit 1105 may be configured to receive a registration accept message from the network.

The communication unit 1105 may include a transmitter, a receiver, and the like. Also, the communication unit 1105 may include or utilize a plurality of transmission and reception paths. In addition, the communication unit 1105 may include at least one antenna array including a plurality of antenna elements. From the perspective of hardware, the communication unit 1105 may include a digital circuit and an analog circuit (e.g., a radio frequency integrated circuit (RFIC)). Here, the digital circuit and the analog circuit may be implemented as one package.

The communication unit 1105 may transmit and receive a signal as described above. Accordingly, the entirety or a part of the communication unit 1105 may be referred to as "transmitting unit," "receiving unit," "transceiver unit," "transmitter," "receiver," or "transceiver." Also, the transmission and reception performed via a wireless channel, which is described hereinbelow, may include the above-described processing performed by the communication unit 1105. The communication unit 1105 may be configured to send an uplink NAS Transport message by the UE 1100 to the network.

The storage unit 1115 may store data, such as a basic program, an application program, configuration information, and the like for operating the UE 1100. The storage unit 1115 may be configured as a volatile memory, a non-volatile memory, or a combination of a volatile memory and a non-volatile memory. In addition, the storage unit 1115 may provide data stored therein in response to a request from the controller 1110.

The controller 1110 may control overall operations of the UE 1100. For example, the controller 1110 may transmit and receive a signal via the communication unit 1105. Further, the controller 1110 records data in the storage unit 1115 and reads the recorded data. The controller 1110 may perform the functions of a protocol stack required by a particular communication standard. To this end, the controller 1110 may include at least one processor or micro-processor or may be a part of the processor. Also, a part of the communication unit 1105 and the controller 1110 may be referred to as a communication processor (CP).

According to some embodiments, the controller 1110 may perform control such that UE 1100 performs operations according to one or more embodiments described above. For the sake of brevity, details of the embodiments that have been already described above are not described in detail herein. In some embodiments, the controller 1110 may be configured to ascertain an incapability of the network to process the at least one pending uplink message based on the registration acceptance message upon receiving the registration accept message from the network. Further, based upon the ascertaining, the controller 1110 may be configured to release an N1 NAS signaling connection between the UE 1100 and the network. In some embodiments, the controller 1110 may also be configured to initiate one of an implementation dependent timer and a T3550 timer upon ascertaining that the network is incapable to process the at least one pending uplink message. Further, the controller 1110 may be configured to release the N1 NAS signaling connection between the UE 1100 and the network upon completion of the one of the implementation dependent timer and the T3550 timer.

According to some embodiments, communication unit 1105 receives, in response to a registration request including an IE indicating presence of at least one pending uplink signal sent by a UE 1100, a registration acceptance message from a network. In some examples, the at least one pending uplink signal is one or more of a SMS, LCS/LPP, and an IMS service. In some examples, the presence of the at least one pending uplink signal is indicated based on a FOR bit set to "Following-On Request Pending" in the IE of the registration request. In some examples, communication unit 1105 sends a mobility registration request upon expiry of one of the implementation dependent timer and the release timer, in response to ascertaining the incapability of the network to process the at least one pending uplink signal based on the registration acceptance message, where the mobility registration request includes a FOR bit set to "NO Following-On Request Pending" in an IE of the mobility registration request.

In some examples, communication unit 1105 sends a mobility registration request in response to re-selecting a new tracking area by the UE 1100 registered in the network in an idle mode. In some examples, communication unit 1105 receives, in response to the mobility registration request, a registration acceptance message from the network indicating an incapability of the network to process the at least one pending uplink signal based on the registration acceptance message. In some examples, communication unit 1105 indicates the at least one uplink signal by the UE 1100 to the network in a bitwise manner in an IE, where the IE is defined as LSB 0th bit including "SMS" if the at least one pending uplink signaling is associated with the SMS service, LSB 1st bit including "LCS/LPP" if the at least one pending uplink signaling is associated with the LCS/LPP service, LSB 2nd bit including "IMS signaling" if the at least one pending uplink signaling is associated with the IMS service, and LSB 0th bit and LSB 1st bit: "others".

In some examples, communication unit 1105 sends, in response to determining incapability of the network to process the at least one pending uplink signal by the UE 1100, a registration complete message including a new IE indicating absence of the at least one pending uplink signal to be processed. In some examples, the absence of the at least one pending uplink signal is indicated based on a FOR bit set to "No Following-On Request Pending" in the new IE. In some examples, communication unit 1105 sends an uplink NAS Transport message by the UE 1100 to the network in response to determining an incapability of the network to process the pending uplink signaling upon a successful registration.

According to some embodiments, communication unit 1105 is configured to receive, in response to a registration request comprising an IE indicating presence of at least one pending uplink signal sent by a UE 1100, a registration acceptance message from a network. In some examples, the at least one pending uplink signal is one or more of a SMS, an LCS/LPP, and an IMS service. In some examples, presence of the at least one pending uplink signal is indicated based on a FOR bit set to "Following-On Request Pending" in the IE of the registration request.

In some examples, the communication unit 1105 is configured to send a mobility registration request upon expiry of one of the implementation dependent timer and the release timer, in response to ascertaining the incapability of the network to process the at least one pending uplink signal based on the registration acceptance message, where the mobility registration request includes a FOR bit set to "NO Following-On Request Pending" in an IE of the mobility registration request. In some examples, the communication unit 1105 is configured to send a mobility registration request in response to re-selecting a new tracking area by the UE 1100 registered in the network in an idle mode, and receive, in response to the mobility registration request, a registration acceptance message from the network indicating an incapability of the network to process the at least one pending uplink signal based on the registration acceptance message.

In some examples, the communication unit 1105 is configured to indicate the at least one uplink signal by the UE 1100 to the network in a bitwise manner in an IE, where the IE is defined as LSB 0th bit including "SMS" if the at least one pending uplink signaling is associated with the SMS service, LSB 1st bit including "LCS/LPP" if the at least one pending uplink signaling is associated with the LCS/LPP service, LSB 2nd bit including "IMS signaling" if the at least one pending uplink signaling is associated with the IMS service, and LSB 0th bit and LSB 1st bit: "others". In some examples, the communication unit 1105 is configured to send, in response to determining incapability of the network to process the at least one pending uplink signal by the UE 1100, a registration complete message including a new IE indicating absence of the at least one pending uplink signal to be processed. In some examples, the absence of the at least one pending uplink signal is indicated based on a FOR bit set to "No Following-On Request Pending" in the new IE. In some examples, the communication unit 1105 is configured to send an uplink NAS Transport message by the UE 1100 to the network, in response to determining an incapability of the network to process the pending uplink signaling upon a successful registration.

According to some embodiments, controller 1110 ascertains an incapability of the network to process the at least one pending uplink signal based on the registration acceptance message, where the registration acceptance message indicates that the network is not capable of processing the at least one pending uplink signal and the UE 1100 is registered at the network. In some examples, controller 1110 performs one of: releasing a NAS signaling connection between the UE 1100 and the network, where the NAS signaling connection is based on camping of the UE 1100 at a cell corresponding to a RAN of the network, or initiating one of an implementation dependent timer and a release timer to release the NAS signaling connection. In some examples, the implementation dependent timer is configured between 0 second to 10 seconds. In some examples, controller 1110 performs, to release the NAS signaling connection, one of releasing the NAS signaling connection between the UE 1100 and the network or initiating one of the implementation dependent timer and the release timer. In some examples, controller 1110 releases the NAS signaling connection by the network, in response to determining an absence of a pending downlink signal, upon receiving the registration complete message.

According to some embodiments, controller 1110 is configured to ascertain an incapability of the network to process the at least one pending uplink signal based on the registration acceptance message, where the registration acceptance message indicates that the network is not capable of processing the at least one pending uplink signal and the UE 1100 is registered at the network; the controller 1110 further configured to perform one of releasing a NAS signaling connection between the UE 1100 and the network, where the NAS signaling connection is based on camping of the UE 1100 at a cell corresponding to a radio access network (RAN) of the network, or initiating one of an implementation dependent timer and a release timer to release the NAS signaling connection. In some examples, the implementation dependent timer is configured between 0 second to 10 seconds. In some examples, the controller 1110 is configured to perform one of releasing the NAS signaling connection between the UE 1100 and the network, or initiating one of the implementation dependent timer and the release timer. In some examples, the controller 1110 is configured to release the NAS signaling connection by the network, in response to determining an absence of a pending downlink signal, upon receiving the registration complete message.

Figure 12:
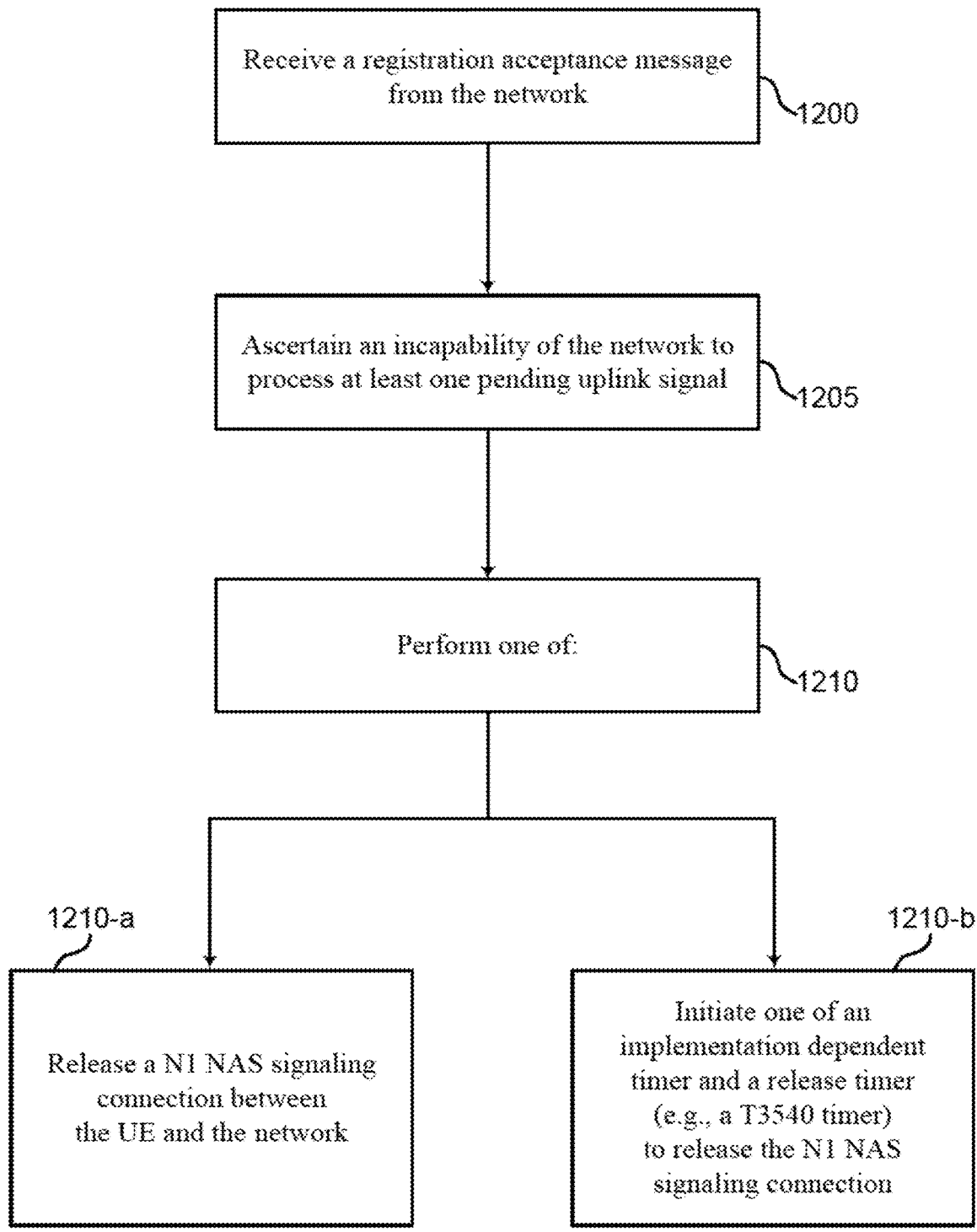
FIGS. 12 through 14 show examples of a process for availing services of a network according to aspects of the present disclosure.

FIG. 12 shows an example of a process for availing services of a network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1200, the system receives, in response to a registration request including an IE indicating presence of at least one pending uplink signal sent by a UE, a registration acceptance message from a network. In some cases, the operations of this step refer to, or may be performed by, a communication unit as described with reference to FIG. 11.

At operation 1205, the system ascertains an incapability of the network to process the at least one pending uplink signal based on the registration acceptance message, where the registration acceptance message indicates that the network is not capable of processing the at least one pending uplink signal and the UE is registered at the network. In some cases, the operations of this step refer to, or may be performed by, a controller as described with reference to FIG. 11.

At operation 1210, the system performs one of operations 1210-*a* or 1210-*b*. At operation 1210-*a*, the system releases a NAS signaling connection between the UE and the network. At operation 1210-*b*, the system initiates one of an implementation dependent timer and a release timer to release the NAS signaling connection. In some cases, the operations of this step refer to, or may be performed by, a controller as described with reference to FIG. 11.

Figure 13:
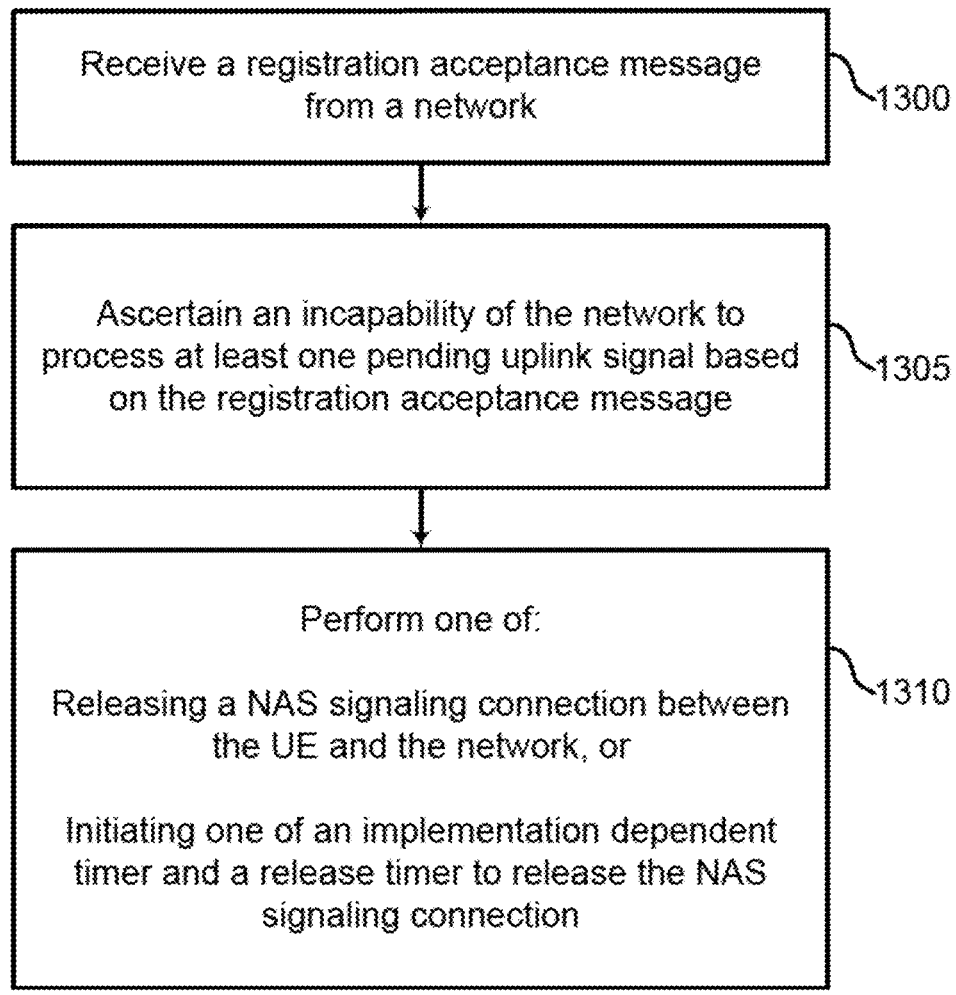

FIG. 13 shows an example of a process for availing services of a network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1300, the system receives, in response to a registration request including an IE indicating presence of at least one pending uplink signal sent by a UE, a registration acceptance message from a network. For example, at 1300, the method includes, receiving, in response to a registration request comprising an IE indicating presence of at least one pending uplink signal sent by the UE, a registration acceptance message from the network. In some cases, the operations of this step refer to, or may be performed by, a communication unit as described with reference to FIG. 11.

At operation 1305, the system ascertains an incapability of the network to process the at least one pending uplink signal based on the registration acceptance message, where the registration acceptance message indicates that the network is not capable of processing the at least one pending uplink signal and the UE is registered at the network. For example, at 1305, the method includes, ascertaining an incapability of the network to process the at least one pending uplink signal based on the registration acceptance message, wherein the registration accept indicates that the network is not capable of processing the at least one pending uplink signal and the UE is registered at the network. In some cases, the operations of this step refer to, or may be performed by, a controller as described with reference to FIG. 11.

At operation 1310, the system performs one of: releasing a NAS signaling connection between the UE and the network or initiating one of an implementation dependent timer and a release timer to release the NAS signaling connection. For instance, in one example, the system releases a N1 NAS signaling connection between the UE and the network, where the N1 NAS signaling connection is based on camping of the UE at a cell corresponding to the NG-RAN of the network. In another example, the system initiates one of an implementation dependent timer and a release timer (T3540 timer) to release the N1 NAS signaling connection. That is, at 1310, the method includes, performing one of releasing a N1 NAS signaling connection between the UE and the network, wherein the N1 NAS signaling connection is based on camping of the UE at a cell corresponding to the NG-RAN of the network and initiating one of an implementation dependent timer and a T3540 timer to release the N1 NAS signaling connection. In some cases, the operations of this step refer to, or may be performed by, a controller as described with reference to FIG. 11.

Figure 14:
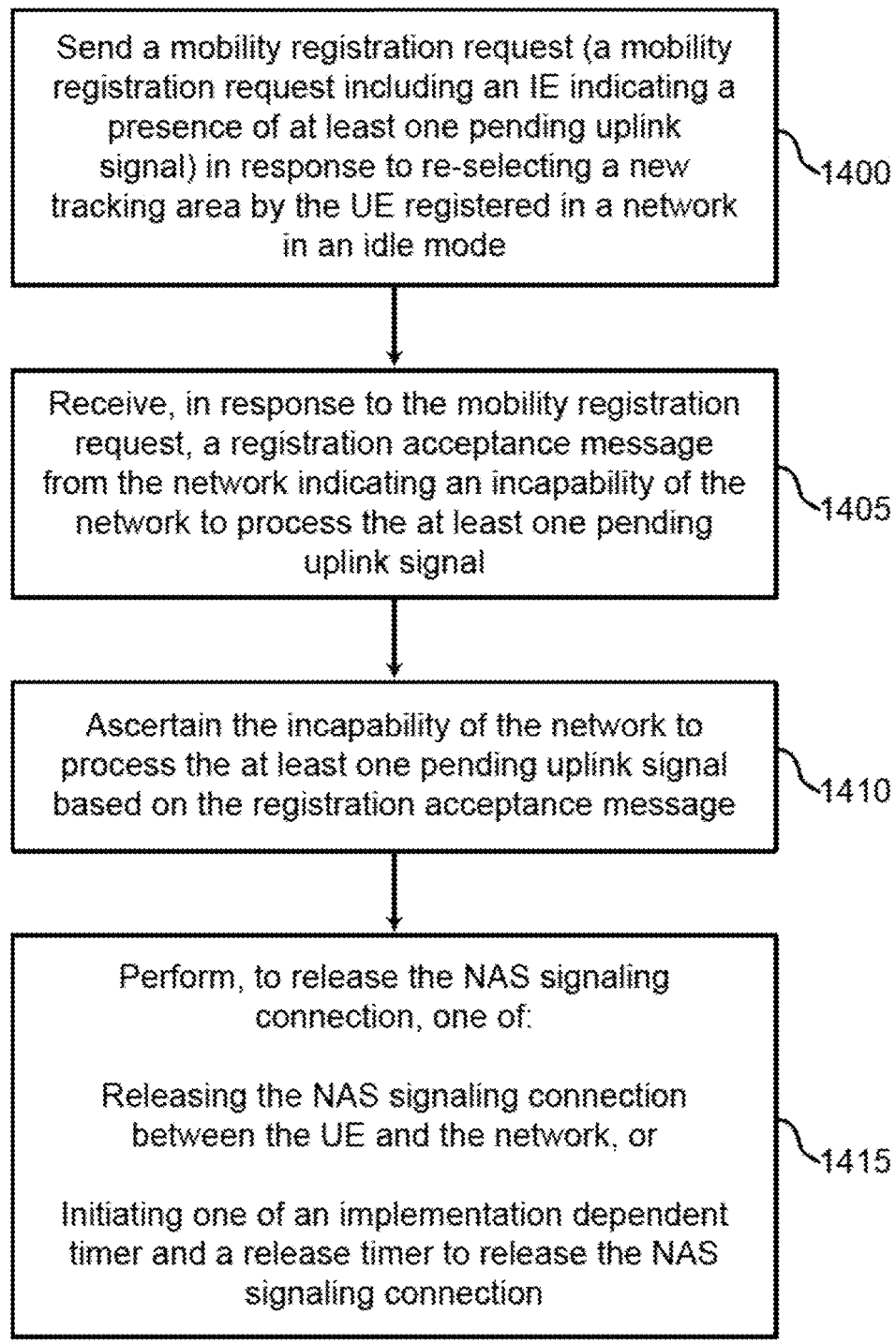

FIG. 14 shows an example of a process for availing services of a network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1400, the system sends a mobility registration request (a mobility registration request including an IE indicating a presence of at least one pending uplink signal) in response to re-selecting a new tracking area by the UE registered in a network in an idle mode. In some cases, the operations of this step refer to, or may be performed by, a communication unit as described with reference to FIG. 11.

At operation 1405, the system receives, in response to the mobility registration request, a registration acceptance message from the network indicating an incapability of the network to process the at least one pending uplink signal. In some cases, the operations of this step refer to, or may be performed by, a communication unit as described with reference to FIG. 11.

At operation 1410, the system ascertains the incapability of the network to process the at least one pending uplink signal based on the registration acceptance message. In some cases, the operations of this step refer to, or may be performed by, a controller as described with reference to FIG. 11.

At operation 1415, the system performs, to release the NAS signaling connection, one of releasing the NAS signaling connection between the UE and the network (where the NAS signaling connection is based on camping of the UE at a cell corresponding to a RAN of the network) or initiating one of an implementation dependent timer and a release timer to release the NAS signaling connection. In some cases, the operations of this step refer to, or may be performed by, a controller as described with reference to FIG. 11.

Accordingly, the present disclosure includes the following embodiments.

A method for network procedures to avail services of a network is described. One or more embodiments of the method include receiving, in response to a registration request comprising an IE indicating presence of at least one pending uplink signal sent by a UE, a registration acceptance message from a network, ascertaining an incapability of the network to process the at least one pending uplink signal based on the registration acceptance message, where the registration acceptance message indicates that the network is not capable of processing the at least one pending uplink signal and the UE is registered at the network, and performing one of: releasing a NAS signaling connection between the UE and the network, where the NAS signaling connection is based on camping of the UE at a cell corresponding to a RAN of the network, or initiating one of an implementation dependent timer and a release timer to release the NAS signaling connection.

An apparatus for network procedures to avail services of a network is described. The apparatus includes a processor, memory in electronic communication with the processor, and instructions stored in the memory. The instructions are operable to cause the processor to perform the steps of receiving, in response to a registration request comprising an IE indicating presence of at least one pending uplink signal sent by a UE, a registration acceptance message from a network, ascertaining an incapability of the network to process the at least one pending uplink signal based on the registration acceptance message, where the registration acceptance message indicates that the network is not capable of processing the at least one pending uplink signal and the UE is registered at the network, and performing one of: releasing a NAS signaling connection between the UE and the network, where the NAS signaling connection is based on camping of the UE at a cell corresponding to a RAN of the network, or initiating one of an implementation dependent timer and a release timer to release the NAS signaling connection.

A non-transitory computer readable medium storing code for network procedures to avail services of a network is described. In some examples, the code comprises instructions executable by a processor to perform the steps of: receiving, in response to a registration request comprising an IE indicating presence of at least one pending uplink signal sent by a UE, a registration acceptance message from a network, ascertaining an incapability of the network to process the at least one pending uplink signal based on the registration acceptance message, where the registration acceptance message indicates that the network is not capable of processing the at least one pending uplink signal and the UE is registered at the network, and performing one of: releasing a NAS signaling connection between the UE and the network, where the NAS signaling connection is based on camping of the UE at a cell corresponding to a RAN of the network, or initiating one of an implementation dependent timer and a release timer to release the NAS signaling connection.

A system for network procedures to avail services of a network is described. One or more embodiments of the system include receiving, in response to a registration request comprising an IE indicating presence of at least one pending uplink signal sent by a UE, a registration acceptance message from a network, ascertaining an incapability of the network to process the at least one pending uplink signal based on the registration acceptance message, where the registration acceptance message indicates that the network is not capable of processing the at least one pending uplink signal and the UE is registered at the network, and performing one of: releasing a NAS signaling connection between the UE and the network, where the NAS signaling connection is based on camping of the UE at a cell corresponding to a RAN of the network, or initiating one of an implementation dependent timer and a release timer to release the NAS signaling connection.

In some examples, the implementation dependent timer is configured between 0 second to 10 seconds. In some examples, the at least one pending uplink signal is one or more of a SMS, LCS/LPP, and an IMS service. In some examples, the presence of the at least one pending uplink signal is indicated based on a FOR bit set to "Following-On Request Pending" in the IE of the registration request.

Some examples of the method, apparatus, non-transitory computer readable medium, and system described above further include sending a mobility registration request upon expiry of one of the implementation dependent timer and the release timer, in response to ascertaining the incapability of the network to process the at least one pending uplink signal based on the registration acceptance message, where the mobility registration request comprises a FOR bit set to "NO Following-On Request Pending" in an IE of the mobility registration request.

Some examples of the method, apparatus, non-transitory computer readable medium, and system described above further include sending a mobility registration request in response to re-selecting a new tracking area by the UE registered in the network in an idle mode. Some examples further include receiving, in response to the mobility registration request, a registration acceptance message from the network indicating an incapability of the network to process the at least one pending uplink signal based on the registration acceptance message. Some examples further include performing, to release the NAS signaling connection, one of releasing the NAS signaling connection between the UE and the network or initiating one of the implementation dependent timer and the release timer.

Some examples of the method, apparatus, non-transitory computer readable medium, and system described above further include indicating the at least one uplink signal by the UE to the network in a bitwise manner in an IE, where the IE is defined as LSB 0th bit comprising "SMS" if the at least one pending uplink signaling is associated with the SMS service, LSB 1st bit comprising "LCS/LPP" if the at least one pending uplink signaling is associated with the LCS/LPP service, LSB 2nd bit comprising "IMS signaling" if the at least one pending uplink signaling is associated with the IMS service, and LSB 0th bit and LSB 1st bit: "others".

Some examples of the method, apparatus, non-transitory computer readable medium, and system described above further include sending, in response to determining incapability of the network to process the at least one pending uplink signal by the UE, a registration complete message comprising a new IE indicating absence of the at least one pending uplink signal to be processed. Some examples further include releasing the NAS signaling connection by the network, in response to determining an absence of a pending downlink signal, upon receiving the registration complete message.

In some examples, the absence of the at least one pending uplink signal is indicated based on a FOR bit set to "No Following-On Request Pending" in the new IE. Some examples of the method, apparatus, non-transitory computer readable medium, and system described above further include sending an uplink NAS Transport message by the UE to the network in response to determining an incapability of the network to process the pending uplink signaling upon a successful registration.

An apparatus for network procedures to avail services of a network is described. One or more embodiments of the apparatus include a communication unit configured to receive, in response to a registration request comprising an Information Element (IE) indicating presence of at least one pending uplink signal sent by a User Equipment (UE), a registration acceptance message from a network and a controller configured to ascertain an incapability of the network to process the at least one pending uplink signal based on the registration acceptance message, where the registration acceptance message indicates that the network is not capable of processing the at least one pending uplink signal and the UE is registered at the network; the controller further configured to perform one of releasing a NAS signaling connection between the UE and the network, where the NAS signaling connection is based on camping of the UE at a cell corresponding to a radio access network (RAN) of the network, or initiating one of an implementation dependent timer and a release timer to release the NAS signaling connection.

A system for network procedures to avail services of a network, the system comprising: a communication unit configured to receive, in response to a registration request comprising an IE indicating presence of at least one pending uplink signal sent by a UE, a registration acceptance message from a network and a controller configured to ascertain an incapability of the network to process the at least one pending uplink signal based on the registration acceptance message, where the registration acceptance message indicates that the network is not capable of processing the at least one pending uplink signal and the UE is registered at the network; the controller further configured to perform one of releasing a NAS signaling connection between the UE and the network, where the NAS signaling connection is based on camping of the UE at a cell corresponding to a radio access network (RAN) of the network, or initiating one of an implementation dependent timer and a release timer to release the NAS signaling connection.

A method of manufacturing an apparatus for network procedures to avail services of a network is described. The method includes a communication unit configured to receive, in response to a registration request comprising an IE indicating presence of at least one pending uplink signal sent by a UE, a registration acceptance message from a network and a controller configured to ascertain an incapability of the network to process the at least one pending uplink signal based on the registration acceptance message, where the registration acceptance message indicates that the network is not capable of processing the at least one pending uplink signal and the UE is registered at the network; the controller further configured to perform one of releasing a NAS signaling connection between the UE and the network, where the NAS signaling connection is based on camping of the UE at a cell corresponding to a RAN of the network, or initiating one of an implementation dependent timer and a release timer to release the NAS signaling connection.

A method of using an apparatus for network procedures to avail services of a network is described. The method includes a communication unit configured to receive, in response to a registration request comprising an IE indicating presence of at least one pending uplink signal sent by a UE, a registration acceptance message from a network and a controller configured to ascertain an incapability of the network to process the at least one pending uplink signal based on the registration acceptance message, where the registration acceptance message indicates that the network is not capable of processing the at least one pending uplink signal and the UE is registered at the network; the controller further configured to perform one of releasing a NAS signaling connection between the UE and the network, where the NAS signaling connection is based on camping of the UE at a cell corresponding to a RAN of the network, or initiating one of an implementation dependent timer and a release timer to release the NAS signaling connection.

In some examples, the implementation dependent timer is configured between 0 second to 10 seconds. In some examples, the at least one pending uplink signal is one or more of a SMS, an LCS/LPP, and an IMS service. In some examples, the presence of the at least one pending uplink signal is indicated based on a FOR bit set to "Following-On Request Pending" in the IE of the registration request.

In some examples, the communication unit is configured to send a mobility registration request upon expiry of one of the implementation dependent timer and the release timer, in response to ascertaining the incapability of the network to process the at least one pending uplink signal based on the registration acceptance message, where the mobility registration request comprises a FOR bit set to "NO Following-On Request Pending" in an IE of the mobility registration request.

In some examples, the communication unit is configured to send a mobility registration request in response to re-selecting a new tracking area by the UE registered in the network in an idle mode, and receive, in response to the mobility registration request, a registration acceptance message from the network indicating an incapability of the network to process the at least one pending uplink signal based on the registration acceptance message.

In some examples, the controller is configured to perform one of releasing the NAS signaling connection between the UE and the network, or initiating one of the implementation dependent timer and the release timer.

In some examples, the communication unit is configured to indicate the at least one uplink signal by the UE to the network in a bitwise manner in an IE, where the IE is defined as LSB 0th bit comprising "SMS" if the at least one pending uplink signaling is associated with the SMS service, LSB 1st bit comprising "LCS/LPP" if the at least one pending uplink signaling is associated with the LCS/LPP service, LSB 2nd bit comprising "IMS signaling" if the at least one pending uplink signaling is associated with the IMS service, and LSB 0th bit and LSB 1st bit: "others".

In some examples, the communication unit is configured to send, in response to determining incapability of the network to process the at least one pending uplink signal by the UE, a registration complete message comprising a new IE indicating absence of the at least one pending uplink signal to be processed. In some examples, the controller is configured to release the NAS signaling connection by the network, in response to determining an absence of a pending downlink signal, upon receiving the registration complete message. In some examples, the absence of the at least one pending uplink signal is indicated based on a FOR bit set to "No Following-On Request Pending" in the new IE. In some examples, the communication unit is configured to send an uplink NAS Transport message by the UE to the network, in response to determining an incapability of the network to process the pending uplink signaling upon a successful registration.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a DSP, an ASIC, a FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   receiving, in response to a registration request comprising an information element (IE) indicating presence of at least one pending uplink signal sent by a user equipment (UE), a registration acceptance message from a network;
   ascertaining an incapability of the network to process the at least one pending uplink signal based on the registration acceptance message, wherein the registration acceptance message indicates that the network is not capable of processing the at least one pending uplink signal and the UE is registered at the network; and
   managing a connection between the UE and the network in response to the registration acceptance message based on the incapability of the network to process the at least one pending uplink signal by managing a Non-Access Stratum (NAS) signaling connection between the UE and the network.

2. The method as claimed in claim 1, wherein an implementation dependent timer is configured between 0 second to 10 seconds.

3. The method as claimed in claim 1, wherein the at least one pending uplink signal is one or more of a Short Messaging Service (SMS), Location Services/Location Positioning Protocol (LCS/LPP), and an internet protocol (IP) Multimedia Subsystem (IMS) service.

4. The method as claimed in claim 1, wherein a presence of the at least one pending uplink signal is indicated based on a follow-on request (FOR) bit set to "Following-On Request Pending" in the IE of the registration request.

5. The method as claimed in claim 1, further comprising:
   sending a mobility registration request upon expiry of one of an implementation dependent timer and a release timer, in response to ascertaining the incapability of the network to process the at least one pending uplink signal based on the registration acceptance message, wherein the mobility registration request comprises a follow-on request (FOR) bit set to "NO Following-On Request Pending" in an IE of the mobility registration request.

6. The method as claimed in claim 1, further comprising:
   sending a mobility registration request, in response to re-selecting a new tracking area by the UE registered in the network in an idle mode;
   receiving, in response to the mobility registration request, a registration acceptance message from the network indicating an incapability of the network to process the at least one pending uplink signal based on the registration acceptance message;
   performing, to release the NAS signaling connection, one of releasing the NAS signaling connection between the UE and the network or initiating one of an implementation dependent timer and a release timer.

7. The method as claimed in claim 1, further comprising:
   indicating the at least one uplink signal by the UE to the network in a bitwise manner in an IE, wherein the IE is defined as LSB 0th bit comprising "SMS" when the at least one pending uplink signal is associated with the SMS service, LSB 1st bit comprising "LCS/LPP" when the at least one pending uplink signal is associated with the LCS/LPP service, LSB 2nd bit comprising "IMS signaling" when the at least one pending uplink signal is associated with the IMS service, and LSB 0th bit and LSB 1st bit: "others".

8. The method as claimed in claim 1, further comprising:
   sending, in response to determining incapability of the network to process the at least one pending uplink signal by the UE, a registration complete message comprising a new IE indicating absence of the at least one pending uplink signal to be processed;
   releasing the NAS signaling connection by the network, in response to determining an absence of a pending downlink signal, upon receiving the registration complete message.

9. The method as claimed in claim 8, wherein the absence of the at least one pending uplink signal is indicated based on a follow-on request (FOR) bit set to "No Following-On Request Pending" in the new IE.

10. The method as claimed in claim 1, further comprising:
    sending an uplink NAS Transport message by the UE to the network, in response to determining an incapability of the network to process the pending uplink signaling upon a successful registration.

11. The method as claimed in claim 1, wherein:
    managing the connection between the UE and the network based on the incapability of the network indicated by the registration acceptance message comprises releasing the NAS signaling connection between the UE and the network, wherein the NAS signaling connection is based on camping of the UE at a cell corresponding to a radio access network (RAN) of the network.

12. The method as claimed in claim 1, wherein:
    managing the connection between the UE and the network based on the incapability of the network indicated by the registration acceptance message comprises initiating an implementation dependent timer to release the NAS signaling connection.

13. The method as claimed in claim 1, wherein:
    managing the connection between the UE and the network based on the incapability of the network indicated by the registration acceptance message comprises initiating a release timer to release the NAS signaling connection.

14. A system comprising:
    a communication unit configured to receive, in response to a registration request comprising an Information Element (IE) indicating presence of at least one pending uplink signal sent by a User Equipment (UE), a registration acceptance message from a network;
    a controller configured to:
    ascertain an incapability of the network to process the at least one pending uplink signal based on the registration acceptance message, wherein the registration acceptance message indicates that the network is not capable of processing the at least one pending uplink signal and the UE is registered at the network; and
    manage a connection between the UE and the network in response to the registration acceptance message based on the incapability of the network to process the at least one pending uplink signal by managing a Non-Access Stratum (NAS) signaling connection between the UE and the network.

15. The system as claimed in claim 14, wherein the at least one pending uplink signal is one or more of a Short Messaging Service (SMS), Location Services/Location Positioning Protocol (LCS/LPP), and an IP Multimedia Subsystem (IMS) service.

16. The system as claimed in claim 14, wherein a presence of the at least one pending uplink signal is indicated based on a follow-on request (FOR) bit set to "Following-On Request Pending" in the IE of the registration request.

17. The system as claimed in claim 14, further comprising:
the communication unit configured to send a mobility registration request upon expiry of one of an implementation dependent timer and a release timer, in response to ascertaining the incapability of the network to process the at least one pending uplink signal based on the registration acceptance message, wherein the mobility registration request comprises a follow-on request (FOR) bit set to "NO Following-On Request Pending" in an IE of the mobility registration request.

18. The system as claimed in claim 14, further comprising:
the communication unit configured to:
send a mobility registration request, in response to re-selecting a new tracking area by the UE registered in the network in an idle mode; and
receive, in response to the mobility registration request, a registration acceptance message from the network indicating an incapability of the network to process the at least one pending uplink signal based on the registration acceptance message;
the controller configured to perform, to release the NAS signaling connection, one of releasing the NAS signaling connection between the UE and the network or initiating one of an implementation dependent timer and a release timer.

19. The system as claimed in claim 14, further comprising:
indicating the at least one uplink signal by the UE to the network in a bitwise manner in an IE, wherein the IE is defined as LSB 0th bit comprising "SMS" if the at least one pending uplink signal is associated with the SMS service, LSB 1st bit comprising "LCS/LPP" if the at least one pending uplink signal is associated with the LCS/LPP service, LSB 2nd bit comprising "IMS signaling" if the at least one pending uplink signal is associated with the IMS service, and LSB 0th bit and LSB 1st bit: "others".

20. The system as claimed in claim 14, further comprising:
the communication unit configured to send, in response to determining incapability of the network to process the at least one pending uplink signal by the UE, a registration complete message comprising a new IE indicating absence of the at least one pending uplink signal to be processed; and
the controller configured to release the NAS signaling connection by the network, in response to determining an absence of a pending downlink signal, upon receiving the registration complete message.

* * * * *